US012537406B2

(12) United States Patent
Takahata et al.

(10) Patent No.: US 12,537,406 B2
(45) Date of Patent: Jan. 27, 2026

(54) ROTATING ELECTRIC MACHINE

(71) Applicant: HITACHI ASTEMO, LTD., Ibaraki (JP)

(72) Inventors: Ryouichi Takahata, Tokyo (JP);
Shigehisa Aoyagi, Hitachinaka (JP);
Noriyuki Maekawa, Hitachinaka (JP);
Daisuke Satou, Tokyo (JP);
Ryuuichirou Iwano, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 191 days.

(21) Appl. No.: 18/578,273

(22) PCT Filed: Feb. 8, 2022

(86) PCT No.: PCT/JP2022/004949
§ 371 (c)(1),
(2) Date: Jan. 10, 2024

(87) PCT Pub. No.: WO2023/007778
PCT Pub. Date: Feb. 2, 2023

(65) Prior Publication Data
US 2024/0322624 A1 Sep. 26, 2024

(30) Foreign Application Priority Data
Jul. 26, 2021 (JP) .................................. 2021-121443

(51) Int. Cl.
*H02K 1/32* (2006.01)
*H02K 9/19* (2006.01)

(52) U.S. Cl.
CPC ................. *H02K 1/32* (2013.01); *H02K 9/19* (2013.01)

(58) Field of Classification Search
CPC . H02K 1/32; H02K 21/14; H02K 9/19; Y02T 10/64
(Continued)

(56) References Cited

U.S. PATENT DOCUMENTS

| 3,241,331 A | 3/1966 | Endress et al. |
| 7,088,021 B2 * | 8/2006 | Kobayashi ............... H02K 9/19 310/52 |

(Continued)

FOREIGN PATENT DOCUMENTS

| JP | 52-123610 U | 9/1977 |
| JP | 2006-006091 A | 1/2006 |

(Continued)

OTHER PUBLICATIONS

International Search Report of PCT/JP2022/004949 dated Apr. 5, 2022.

*Primary Examiner* — Alex W Mok
(74) *Attorney, Agent, or Firm* — MATTINGLY & MALUR, PC

(57) ABSTRACT

A rotating electric machine includes a shaft connected to a rotor, and a facing member fixed to the shaft and facing an end surface of the rotor via a space. The shaft includes an inner flow path through which a refrigerant flows, and a communication hole that allows the inner flow path to communicate with the space. The facing member includes first blade portions arranged along a circumferential direction. The first blade portion has a first inclined surface inclined with respect to a radial direction such that a distance to the end surface becomes shorter from the inner side in the radial direction toward the outer side in the radial direction. The first inclined surface comes into contact with a refrig- (Continued)

erant sprayed from the inner flow path through the communication hole by rotation of the shaft, and sprays the refrigerant toward a coil end.

10 Claims, 12 Drawing Sheets

(58) Field of Classification Search
USPC .......................................................... 310/52
See application file for complete search history.

(56) References Cited

U.S. PATENT DOCUMENTS

| | | | |
|---|---|---|---|
| 9,729,027 B2 * | 8/2017 | Miyamoto | ............... H02K 9/19 |
| 9,960,649 B2 * | 5/2018 | Yoshinori | ............... H02K 9/197 |
| 10,574,118 B2 * | 2/2020 | Asagara | ................. H02K 7/116 |
| 10,707,726 B2 * | 7/2020 | Manabe | ................... H02K 1/32 |
| 2013/0076169 A1 | 3/2013 | Pal | |

FOREIGN PATENT DOCUMENTS

| | | | | |
|---|---|---|---|---|
| JP | 2007-159325 A | | 6/2007 | |
| JP | 2009-303293 A | | 12/2009 | |
| JP | 2016135078 A | * | 7/2016 | ............... H02K 9/19 |

* cited by examiner

ENLARGED VIEW OF SLOT

ENLARGED PERSPECTIVE VIEW OF INCLINED PORTION

ROTATING ELECTRIC MACHINE

TECHNICAL FIELD

The present invention relates to a rotating electric machine.

BACKGROUND ART

A rotating electric machine (electric motor) that includes a rotor including a permanent magnet and a stator around which a coil is wound, and cools the coil by spraying a refrigerant to a coil end is known (see PTL 1). PTL 1 discloses a rotating electric machine in which a shaft of the rotor is provided with a flow path through which a refrigerant flows, a spray nozzle that sprays the refrigerant in the flow path, and a guide portion that guides a refrigerant blown from the spray nozzle by centrifugal force to a permanent magnet exposed on an end surface of the rotor. In the rotating electric machine, a refrigerant sprayed to an end surface of the rotor is sprayed to the inner side of the coil end by centrifugal force of the rotating electric machine.

CITATION LIST

Patent Literature

PTL 1: JP 2006-6091 A

SUMMARY OF INVENTION

Technical Problem

However, since the rotating electric machine described in PTL 1 is configured to spray a refrigerant sprayed to an end surface of the rotor to the inner peripheral side of the coil end by centrifugal force of the rotor, a spraying range of the refrigerant to the coil end is narrow, and there is room for improvement from the viewpoint of a cooling effect.

An object of the present invention is to effectively cool a coil by spraying a refrigerant to a coil end over a wide range.

Solution to Problem

A rotating electric machine according to one aspect of the present invention includes a stator including a stator core and a coil mounted on the stator core, a rotor arranged with the stator with a gap interposed between them, a shaft connected to the rotor, and a facing member fixed to the shaft and facing an end surface in an axial direction of the rotor with a space interposed between them. The shaft includes an inner flow path through which a refrigerant flows, and a communication hole that allows the inner flow path to communicate with the space, the facing member includes a plurality of first blade portions arranged along a circumferential direction of the rotor, the first blade portion has a first inclined surface inclined with respect to a radial direction of the rotor such that a distance to the end surface of the rotor becomes shorter from an inner side in the radial direction toward an outer side in the radial direction of the rotor, and the first inclined surface comes into contact with a refrigerant sprayed from the inner flow path through the communication hole by rotation of the shaft, and sprays the refrigerant toward a coil end of the coil.

Advantageous Effects of Invention

According to the present invention, a refrigerant is sprayed to a coil end in a wide range so that a coil can be effectively cooled.

DESCRIPTION OF EMBODIMENTS

A rotating electric machine according to an embodiment of the present invention will be described with reference to the drawings. The rotating electric machine according to the present embodiment is a rotating electric machine preferably used as a power source for traveling of an automobile. The rotating electric machine according to the present embodiment can be applied to both a pure electric vehicle that travels only by a driving force of the rotating electric machine and a hybrid electric vehicle that travels by a driving force of both an engine and the rotating electric machine.

First Embodiment

Figure 1:
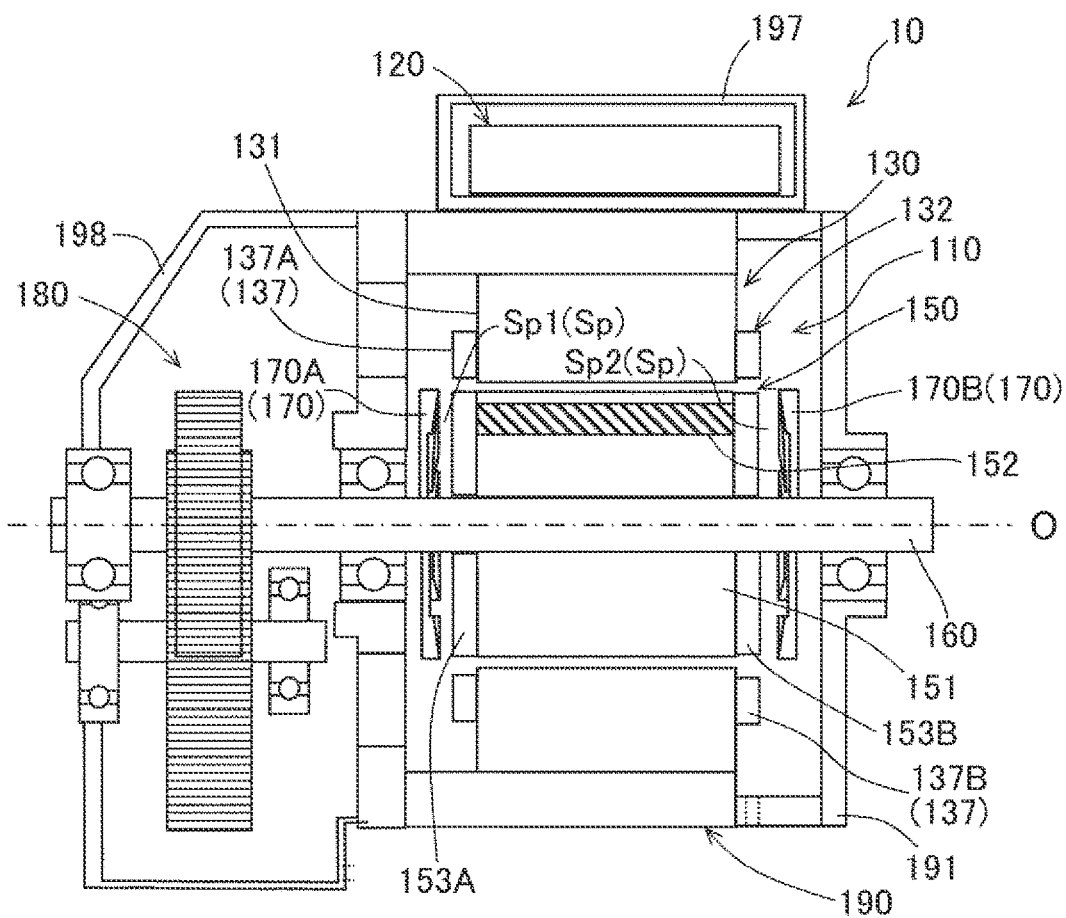
FIG. 1 is a schematic cross-sectional side view of an electric drive system including a rotating electric machine according to a first embodiment.

A rotating electric machine according to a first embodiment of the present invention will be described with reference to FIGS. 1 to 9. FIG. 1 is a schematic cross-sectional side view of an electric drive system 10 including a rotating electric machine 110 according to the first embodiment of the present invention. As illustrated in FIG. 1, the electric drive system 10 includes the rotating electric machine 110, an inverter 120 that converts DC power into AC power and supplies the AC power to the rotating electric machine 110, a speed reducer 180, and a housing 190 that houses them.

The housing 190 includes a motor housing 191 that houses the rotating electric machine 110, an inverter housing 197 that houses the inverter 120, and a gear housing 198 that houses the speed reducer 180. The motor housing 191 and the inverter housing 197 are formed by integral molding.

For example, the motor housing 191 and the inverter housing 197 can be molded as one structure by casting or die casting. Since the rotating electric machine 110 and the inverter 120 are put in one package, mounting work on a vehicle can be improved as compared with a case where the rotating electric machine 110 and the inverter 120 are individually mounted on an electric vehicle (also referred to as a vehicle). Further, a cable can be omitted as compared with a case where the rotating electric machine 110 and the inverter 120 are separately arranged. By the above, the weight of the electric drive system 10 can be reduced, and noise can be further reduced.

The gear housing 198 is fastened to the motor housing 191 by a fastening member such as a bolt and a nut (not illustrated). As illustrated in the diagram, the electric drive system 10 is mounted on a vehicle such that a rotation center axis O of the rotating electric machine 110 is horizontal.

The inverter 120 includes a plurality of power semiconductor elements (not illustrated) and a control circuit (not illustrated) that controls the power semiconductor element. The inverter 120 is connected to a power storage device (not illustrated), and converts DC power from the power storage device into AC power.

The power storage device includes, for example, a capacitor or a secondary battery such as a lithium ion battery or a nickel hydrogen battery. The power storage device supplies electric power to the rotating electric machine 110 during power traveling, and receives power from the rotating electric machine 110 during regenerative traveling. Power is exchanged between the power storage device and the rotating electric machine 110 via the inverter 120.

Rotational torque generated by the rotating electric machine 110 is transmitted to a wheel of a vehicle via the speed reducer 180 and a differential gear (not illustrated). By the above, a wheel rotates, and a vehicle travels. The inverter 120 controls the rotating electric machine 110 so as to generate torque output or generated power according to a command based on a torque command from an integrated control device (not illustrated).

A control circuit of the inverter 120 controls switching operation of a power semiconductor element based on a command from the integrated control device (not illustrated). By switching operation of the power semiconductor element, the rotating electric machine 110 is operated as an electric motor or a generator.

In a case where the rotating electric machine 110 is operated as an electric motor, DC power from the power storage device is supplied to a DC terminal of the inverter 120. A control circuit of the inverter 120 controls switching operation of the power semiconductor element to convert supplied DC power into three-phase AC power, and supplies the three-phase AC power to the rotating electric machine 110.

On the other hand, in a case where the rotating electric machine 110 is operated as a generator, a rotor 150 of the rotating electric machine 110 is rotationally driven by rotational torque applied from the outside, and three-phase AC power is generated in a coil. The generated three-phase AC power is converted into DC power by the inverter 120, and the DC power is supplied to the power storage device, so that the power storage device is charged.

Figure 2:
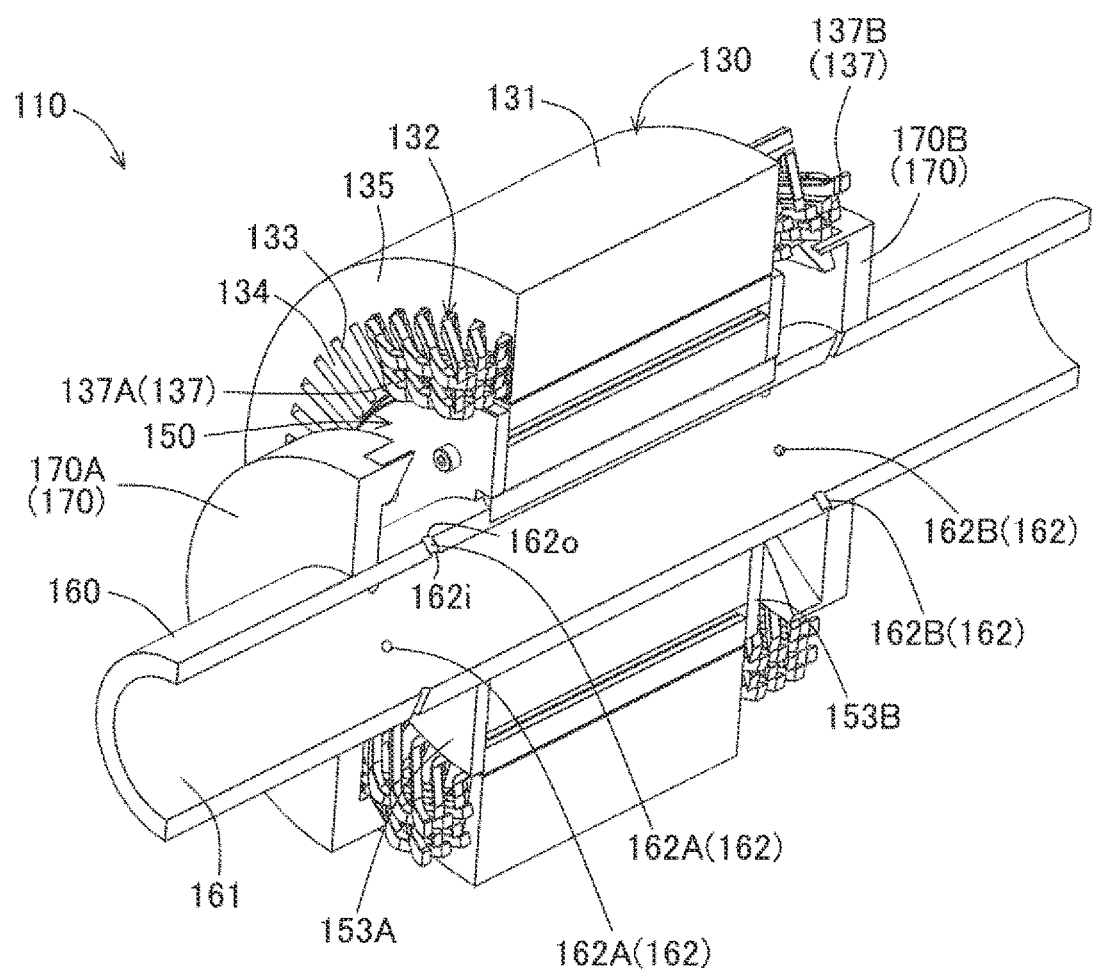
FIG. 2 is a cross-sectional perspective view of the rotating electric machine according to the first embodiment.
Figure 3:
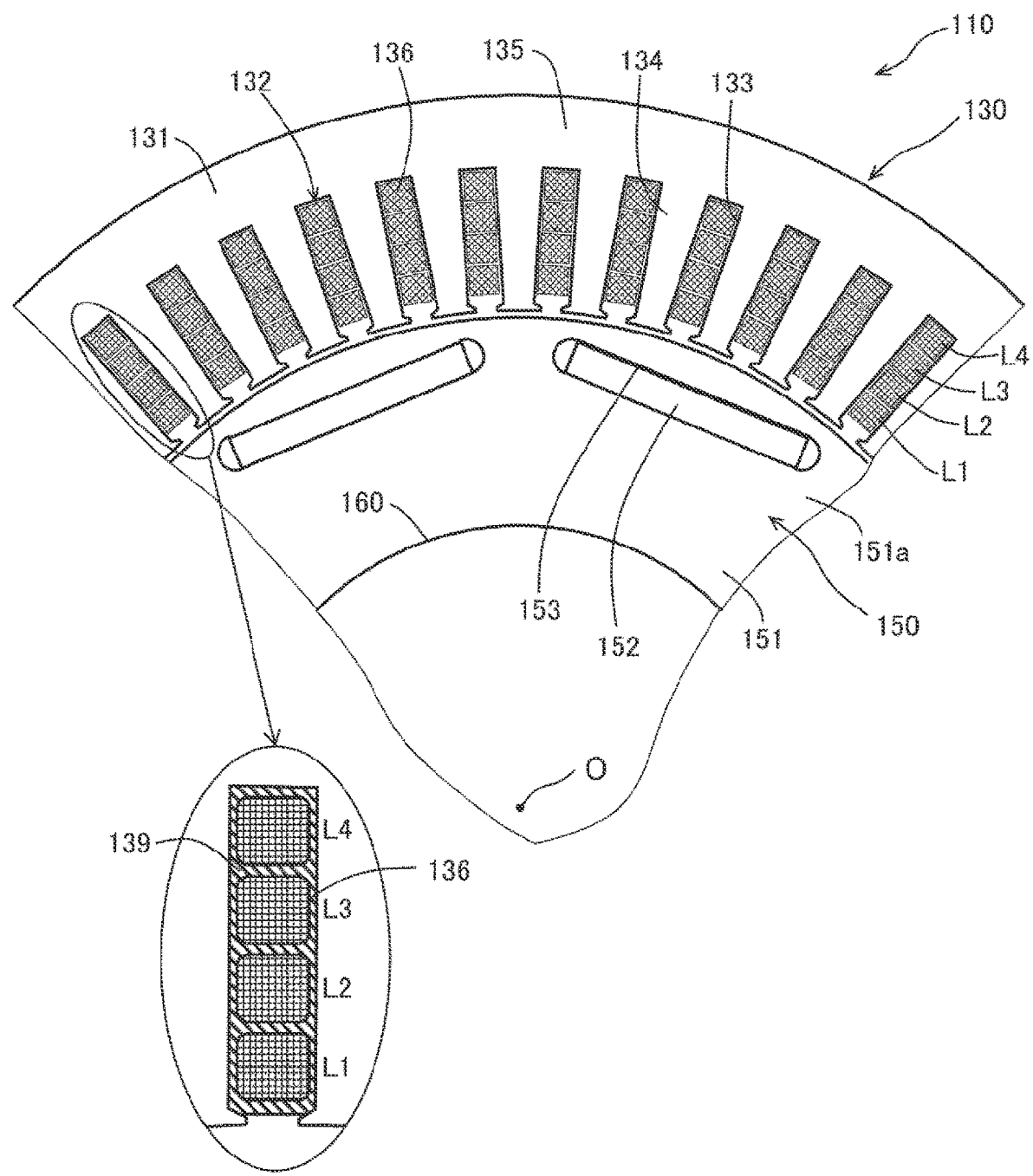
FIG. 3 is a schematic cross-sectional plan view illustrating a part of the rotating electric machine according to the first embodiment.

FIG. 2 is a cross-sectional perspective view of the rotating electric machine 110, and FIG. 3 is a schematic cross-sectional plan view illustrating a part of the rotating electric machine 110. In FIG. 2, only a part of a coil 132 attached to a stator 130 is illustrated. The rotating electric machine 110 according to the present embodiment is an interior permanent magnet three-phase synchronous motor generator.

As illustrated in FIGS. 1 to 3, the rotating electric machine 110 includes the stator 130 having a cylindrical shape fixed to the motor housing 191, the rotor 150 having a cylindrical shape rotatably arranged with the stator 130 with a gap interposed between them, and a shaft 160 connected to the rotor 150. The rotor 150 is arranged on the inner peripheral side of the stator 130.

Note that, in the present description, an "axial direction", a "circumferential direction", and a "radial direction" are as described below. The "axial direction" is a direction along the rotation center axis (hereinafter, also referred to as a rotation axis) O of the rotor 150. The "circumferential direction" is a direction along a rotation direction of the rotor 150, that is, a circumferential direction around the rotation axis O. The "radial direction" is a direction orthogonal to the rotation axis O, that is, a radial direction of a circle around the rotation axis O. Further, the "inner peripheral side" refers to the inner side in the radial direction, and the "outer peripheral side" refers to the opposite direction, that is, the outer side in the radial direction.

The stator 130 includes a stator core 131 having a cylindrical shape and the coil 132 mounted on the stator core 131. The stator core 131 is formed, for example, by laminating a plurality of electromagnetic steel sheets having an annular shape. The stator core 131 is fitted and fixed to the inner side of the motor housing 191 (see FIG. 1).

As illustrated in FIGS. 2 and 3, a plurality of (48 in the present embodiment) slots 133 parallel to a central axis direction of the stator core 131 are formed in an inner peripheral portion of the stator core 131. A tooth 134 is formed between the slots 133. The slot 133 is a semi-closed parallel slot having side surfaces parallel to each other along the radial direction of the stator core 131. That is, the slot 133 has a constant width in the circumferential direction from an outer peripheral end to a flange portion at a tip of the tooth 134. In the slot 133, a plurality of phase windings of U-phase, V-phase, and W-phase constituting the coil 132 are arranged. A plurality of the slots 133 are formed at equal intervals in the circumferential direction of the stator core 131.

A plurality of the teeth 134 are formed so as to protrude from a core back 135 having an annular shape toward the rotation axis O. The tooth 134 forms a magnetic path in the radial direction, and the core back 135 forms a magnetic path in the circumferential direction. The tooth 134 guides a rotating magnetic field generated by the coil 132 to the rotor 150, and causes the rotor 150 to generate rotational torque.

As illustrated in FIG. 2, the coil 132 is wound around the stator core 131 by distributed winding (wave winding). The distributed winding is a winding method in which a phase winding is wound around the stator core 131 so that the phase winding is housed in two of the separated slots 133 across a plurality of the slots 133.

As illustrated in FIGS. 2 and 3, the coil 132 includes an in-slot conductor 136 (see FIG. 3) which is a coil conductor arranged in the slot 133 of the stator core 131, and coil ends 137 (see FIG. 2) which are coil conductors arranged to protrude from both ends of the stator core 131 to the outside of the slot 133. The coil 132 has a rectangular cross section, and is formed of, for example, a rectangular wire in which a conductor (conductive wire) containing copper as a main component is covered with an insulating film such as an enamel film.

The coil 132 is formed, for example, as a plurality of U-shaped segment conductors are connected in a wave shape. As illustrated in FIG. 2, a central portion of the segment conductor constitutes a coil end 137A on a first side in the axial direction of the stator 130. End portions on both sides of the segment conductor are welded to constitute a coil end 137B on a second side in the axial direction of the stator 130.

As illustrated in an enlarged view of a slot of FIG. 3, four of the in-slot conductors 136 having a rectangular cross section are arranged in one row in the radial direction in one of the slots 133. That is, in the slot 133, the plurality of the in-slot conductors 136 are arranged in layers in the radial direction. Hereinafter, housing portions of a coil conductor in the slot 133 in which each of the in-slot conductors 136 is arranged are referred to as a first layer L1, a second layer L2, a third layer L3, and a fourth layer L4 in order from the inner peripheral side (slot opening side) toward the outer peripheral side of the slot 133.

An insulating material 139 is provided between an inner peripheral surface of the slot 133 and the in-slot conductor 136 and between a plurality of the in-slot conductors 136 in the slot 133. The insulating material 139 is, for example, varnish, and is applied between an inner peripheral surface of the slot 133 and a coil conductor and between adjacent coil conductors. Note that the insulating material 139 is not limited to varnish as long as the insulating material 139 is a non-conductive substance. For example, insulating paper may be employed as the insulating material 139. Varnish may be applied after insulating paper is provided in the slot 133. By the above, insulation reliability of the rotating electric machine 110 can be improved.

As illustrated in FIGS. 1 and 3, the rotor 150 includes a rotor core 151, a plurality of permanent magnets 152 fixed to the rotor core 151, and nonmagnetic end plates 153A and 153B (see FIG. 1).

The shaft 160 is fixed to a through hole of the rotor core 151 by press fitting or shrink fitting. As illustrated in FIG. 1, the rotor 150 is rotatably held inside the stator core 131 by the shaft 160 being supported by a plurality of bearings provided in the housing 190.

The rotor core 151 is formed, for example, by laminating a plurality of electromagnetic steel sheets having an annular shape. The permanent magnet 152 forms a field pole of the rotor 150. As the permanent magnet 152, a neodymium-based or samarium-based sintered magnet, a ferrite magnet, a neodymium-based bonded magnet, or the like can be used.

As illustrated in FIG. 3, in the rotor core 151, magnet insertion holes 153 having a rectangular parallelepiped shape are formed at equal intervals in the circumferential direction in the vicinity of an outer peripheral portion. The permanent magnet 152 is embedded in each of the magnet insertion holes 153 and fixed with an adhesive or the like. As illustrated in FIGS. 1 and 2, the end plates 153A and 153B have a disk shape, and are attached to the rotor core 151 so as to close an opening of the magnet insertion hole 153. The permanent magnet 152 is pressed in the axial direction by the end plates 153A and 153B, and a position in the axial direction of the permanent magnet 152 is regulated. An end surface in the axial direction of the rotor core 151 and end surfaces in the axial direction of the end plates 153A and 153B are flat surfaces orthogonal to the rotation axis O.

A magnetization direction of the permanent magnet 152 illustrated in FIG. 3 is directed in the radial direction, and a direction of the magnetization direction is reversed for each field pole. That is, assuming that a surface on the stator 130 side of the permanent magnet 152 for forming a certain magnetic pole is magnetized to the N pole and a surface on the shaft 160 side is magnetized to the S pole, a surface on the stator 130 side of the permanent magnet 152 forming an adjacent magnetic pole is magnetized to the S pole, and a surface on the shaft 160 side is magnetized to the N pole.

In the rotating electric machine 110 according to the present embodiment, the number of poles is eight, and 12 of the slots 133 are arranged at an electrical angle of 360 degrees. For example, 12 of the slots 133 illustrated in FIG. 3 correspond to two poles (one magnetic pole pair). The number of the slots 133 for one electrical angle cycle is obtained by dividing the total number of slots (48 slots) by the number of pole pairs (four pole pairs). Note that the number of pole pairs is the number of pairs of N poles and S poles, and corresponds to the number of poles/2 of the rotating electric machine 110. The number of slots per pole of the rotating electric machine 110 is six, and the number NSPP of slots per phase per pole is two (NSPP=the number of slots/the number of poles/the number of phases=48 slots/8 poles/3 phases=6/3).

As illustrated in FIGS. 1 and 2, the shaft 160 is a cylindrical member extending along the axial direction, and has a flow path (hereinafter, also referred to as an inner flow path) 161 through which oil as a refrigerant to be described later flows.

As illustrated in FIG. 1, the shaft 160 protrudes from the motor housing 191 toward the gear housing 198, and a gear constituting a part of the speed reducer 180 is fixed to the protruding portion.

The speed reducer 180 includes a plurality of gears and transmits torque output from the rotating electric machine 110 to a differential gear. The speed reducer 180 decreases a rotational speed of the rotating electric machine 110 and increases torque output from the rotating electric machine 110 according to a reduction ratio. The differential gear transmits torque output from the rotating electric machine 110 to a wheel of a vehicle. The differential gear transmits torque to a pair of output shafts connected to wheels while absorbing a speed difference between left and right wheels when a vehicle turns.

An oil reservoir in which oil is accumulated is provided in a lower portion of the gear housing 198. The oil is, for example, automatic transmission fluid (ATF) that can be used for lubrication and cooling of each portion. Oil in the oil reservoir is scraped up by operation of the speed reducer 180 and a differential gear (not illustrated), and a part of the oil is introduced into a reservoir tank (not illustrated) arranged in an upper portion of the gear housing 198. Oil introduced into the reservoir tank is supplied to the inner flow path 161 of the shaft 160 through an oil passage (not illustrated) by gravity.

A pair of facing members 170A and 170B are fixed to the shaft 160. A pair of the facing members 170A and 170B are arranged on both sides in the axial direction of the rotor 150. Specifically, the first facing member 170A is arranged so as to face one end surface in the axial direction (left side end surface in the diagram) of the rotor 150 via a first space Sp1, and the second facing member 170B is arranged so as to face the other end surface in the axial direction (right side end surface in the diagram) of the rotor 150 via a second space Sp2.

The first facing member 170A and the second facing member 170B have mirror-symmetrical shapes and have similar configurations. Hereinafter, the first facing member 170A and the second facing member 170B are collectively referred to as a facing member 170, and the first space Sp1 and the second space Sp2 are collectively referred to as a space Sp. Details of the configuration and arrangement of the facing member 170 will be described later.

As illustrated in FIG. 2, the shaft 160 has a plurality of communication holes 162A and 162B that allows the inner flow path 161 to communicate with the outside of the shaft 160. The shaft 160 has eight of the first communication holes 162A, the number of which is the same as the number of magnetic poles, between one end surface in the axial direction of the rotor 150 and the first facing member 170A. A plurality of the first communication holes 162A are formed at equal intervals along the circumferential direction of the shaft 160. The first communication hole 162A allows the first space Sp1 (see FIG. 1) to communicate with the inner flow path 161 of the shaft 160.

Similarly, the shaft 160 has eight of the second communication holes 162B, the number of which is the same as the number of magnetic poles, between the other end surface in the axial direction of the rotor 150 and the second facing member 170B. A plurality of the second communication holes 162B are formed at equal intervals along the circumferential direction of the shaft 160. The second communication hole 162B allows the second space Sp2 (see FIG. 1) to communicate with the inner flow path 161 of the shaft 160.

Since the first communication hole 162A and the second communication hole 162B have the same configuration, hereinafter, the first communication hole 162A and the second communication hole 162B are collectively referred to as a communication hole 162. In the communication hole 162, an opening formed on an inner peripheral surface of the shaft 160 is an oil inlet (refrigerant inlet) 162i, and an opening formed on an outer peripheral surface of the shaft 160 is an oil outlet (refrigerant outlet) 162O. A distance from an end surface in the axial direction of the rotor 150 to the center of the oil outlet 162O is larger than a distance from an end surface of the rotor 150 to the center of the oil inlet 162i.

A configuration and arrangement of the facing member 170 will be described in detail with reference to FIGS. 4, 5, and 6. Note that, as described above, the first facing member 170A and the second facing member 170B have the same configuration. For this reason, the first facing member 170A will be described below as a representative. Further, an end surface in the axial direction of the rotor 150, that is, an end surface of the end plate 153A will be described as a reference plane R0.

Figure 4:
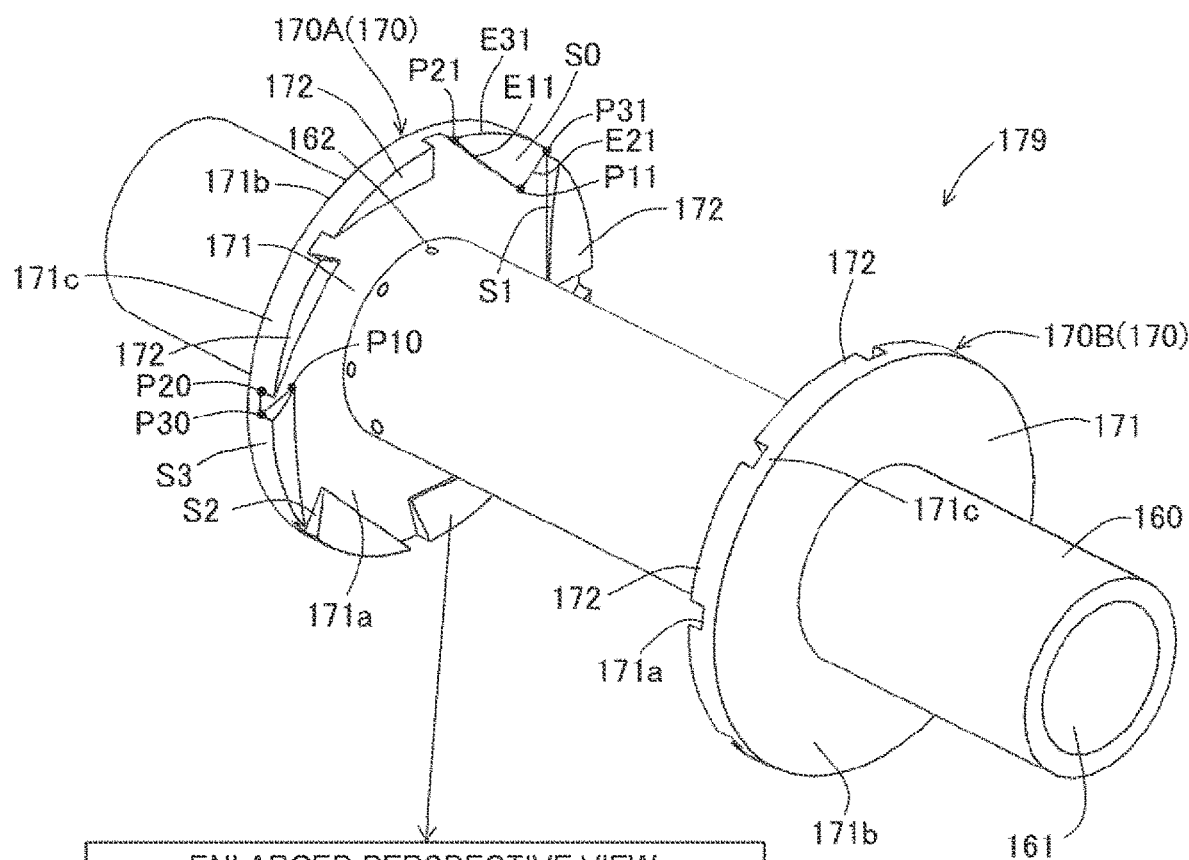
FIG. 4 is a perspective view of a rotating body of the rotating electric machine according to the first embodiment.
Figure 4:
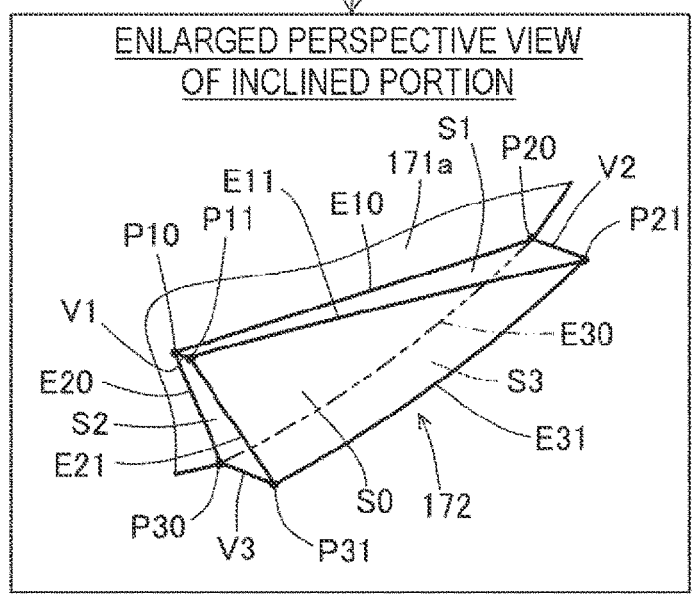

FIG. 4 is a perspective view of a rotating body 179 in which the facing member 170 is fixed to the shaft 160. FIG. 5 is a schematic cross-sectional side view of the rotating electric machine 110 illustrated in FIG. 2, and is a diagram for explaining an arrangement relationship of the facing member 170, the communication hole 162, and the stator 130 of the rotating electric machine 110. In FIG. 5, similarly to FIG. 2, illustration of a part of the coil 132 is omitted. Note that, in FIG. 5, a configuration of the rotor 150 is indicated by a two-dot chain line. FIG. 6 is a schematic cross-sectional view of the rotating body 179 viewed from the axial direction. FIG. 6 schematically illustrates the shaft 160 cut along a plane orthogonal to the axial direction between the facing member 170 and the rotor 150.

As illustrated in FIG. 4, the rotating body 179 includes the shaft 160 and a pair of the facing members 170 fixed to the shaft 160. The facing member 170 includes a disc portion 171 having a disk shape and a plurality of first blade portions 172 provided along an outer periphery of the disc portion 171. The facing member 170 according to the present embodiment includes eight of the first blade portions 172, the number of which is the same as the number of magnetic poles.

A plurality of the first blade portions 172 are arranged at equal intervals along the circumferential direction of the rotor 150. The facing member 170 according to the present embodiment has a rotational symmetry shape about the rotation axis O. The rotational symmetry shape is a shape that does not change when rotationally moved by a certain angle around the rotation axis O that is a symmetry axis. The facing member 170 according to the present embodiment has an 8-fold rotational symmetry shape that overlaps itself when rotated by 45 degrees, that is, (360/n) degrees (n=8) around the rotation axis O.

The disc portion 171 has an end surface 171a on one side in the axial direction (rotor side), an end surface 171b on the other side in the axial direction (side opposite to the rotor side), and an outer peripheral surface 171c connecting the end surface 171a and the end surface 171b. The end surfaces 171a and 171b are flat surfaces orthogonal to the axial direction. The disc portion 171 is provided with a through hole through which the shaft 160 passes.

The first blade portion 172 is formed so as to protrude from the end surface 171a of the disc portion 171 toward the reference plane R0 (end surface of the rotor 150), and has a triangular prism shape. The first blade portion 172 includes a first inclined surface S0 inclined with respect to a surface orthogonal to the axial direction, and a first side surface S1, a second side surface S2, and a third side surface S3 connecting the first inclined surface S0 and the end surface 171a of the disc portion 171. Since a plurality of the first blade portions 172 have the same configuration, the configuration will be described in detail below focusing on one of the first blade portions 172.

The first inclined surface S0 has a triangular shape, and is a surface surrounded by a tip side long side E11 having a curved shape that connects a first tip point P11 and a second tip point P21, a tip side short side E21 having a linear shape that connects the first tip point P11 and a third tip point P31, and a tip side arc side E31 having an arc shape that connects the second tip point P21 and the third tip point P31. The tip side long side E11 is longer than the tip side short side E21. Note that the tip side long side E11 may have a linear shape. Further, the tip side short side E21 may have a curved shape.

The first side surface S1 is a surface connecting the tip side long side E11 of the first inclined surface S0 and the disc portion 171, and rises at a right angle from the end surface 171a of the disc portion 171. The first side surface S1 is a surface surrounded by a base end side long side E10, a first vertical side V1, a second vertical side V2, and the tip side long side E11.

The base end side long side E10 is a linear side connecting a first base end point P10 on the end surface 171a of the disc portion 171 and a second base end point P20 on the end surface 171a of the disc portion 171. The first vertical side V1 is a side connecting the first base end point P10 and the first tip point P11, and is perpendicular to the end surface 171a of the disc portion 171. The second vertical side V2 is a side connecting the second base end point P20 and the second tip point P21, and is perpendicular to the end surface 171a of the disc portion 171.

The second side surface S2 is a surface connecting the tip side short side E21 of the first inclined surface S0 and the disc portion 171, and rises at a right angle from the end surface 171a of the disc portion 171. The second side surface S2 is a surface surrounded by a base end side short side E20, the first vertical side V1, a third vertical side V3, and the tip side short side E21.

The base end side short side E20 is a linear side connecting the first base end point P10 and a third base end point P30 on the end surface 171a of the disc portion 171. The third vertical side V3 is a side connecting the third base end point P30 and the third tip point P31, and is perpendicular to the end surface 171a of the disc portion 171.

The third side surface S3 is a surface connecting the tip side arc side E31 and the disc portion 171, and is continuous with the outer peripheral surface 171c of the disc portion 171. The third side surface S3 is a surface surrounded by a base end side imaginary line E30, the second vertical side V2, the third vertical side V3, and the tip side arc side E31. The base end side imaginary line E30 is an imaginary line connecting the second base end point P20 and the third base end point P30, and has an arc shape around the rotation axis O.

Figure 6:
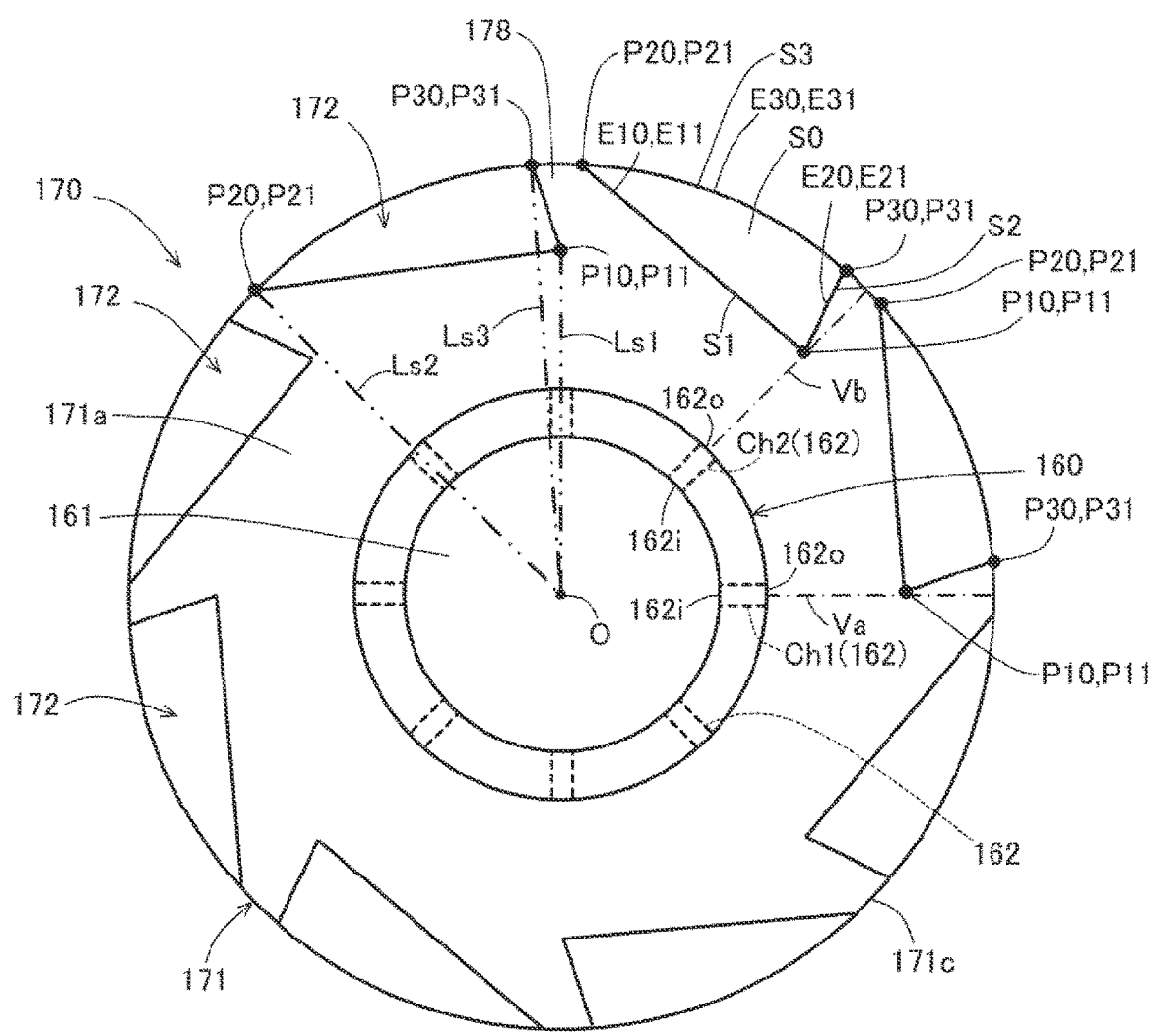
FIG. 6 is a schematic cross-sectional view of the rotating body viewed from an axial direction.

As illustrated in FIG. 6, the second base end point P20 and the third base end point P30 are located on the outer peripheral surface 171c of the disc portion 171. On the other hand, the first base end point P10 is located further on the inner side in the radial direction than the outer peripheral surface 171c of the disc portion 171.

When the facing member 170 is viewed from the axial direction, the first base end point P10 is arranged in the vicinity of an imaginary line Va or on the imaginary line Va extending in the radial direction from the center of the oil outlet 1620 of a predetermined one of the communication holes 162 (for example, a communication hole Ch1). Further, when the facing member 170 is viewed from the axial direction, the second base end point P20 is arranged in the vicinity of an imaginary line Vb or on the imaginary line Vb extending in the radial direction from the center of the oil outlet 1620 of the communication hole 162 (for example, a communication hole Ch2) adjacent to the predetermined communication hole Ch1 (162). The third base end point P30 is arranged closer to the second base end point P20 in the circumferential direction than the first base end point P10.

That is, an angle formed by a line segment Ls2 connecting the rotation axis O and the second base end point P20 and a line segment Ls3 connecting the rotation axis O and the third base end point P30 is smaller than an angle formed by a line segment Ls1 connecting the rotation axis O and the first base end point P10 and the line segment Ls2 connecting the rotation axis O and the second base end point P20. An angle formed by the base end side long side E10 and the line segment Ls1 is about 90 degrees. An angle formed by the base end side short side E20 and the line segment Ls1 is larger than the angle formed by the base end side long side E10 and the line segment Ls1. The base end side long side E10 extends along the circumferential direction, and the base end side short side E20 extends along the radial direction.

The base end side long side E10 is longer than the base end side short side E20. The sum of lengths of the base end side long sides E10 of eight of the first blade portions 172 provided in the facing member 170 is longer than a length (circumferential length) of an outer periphery of the facing member 170.

Figure 5:
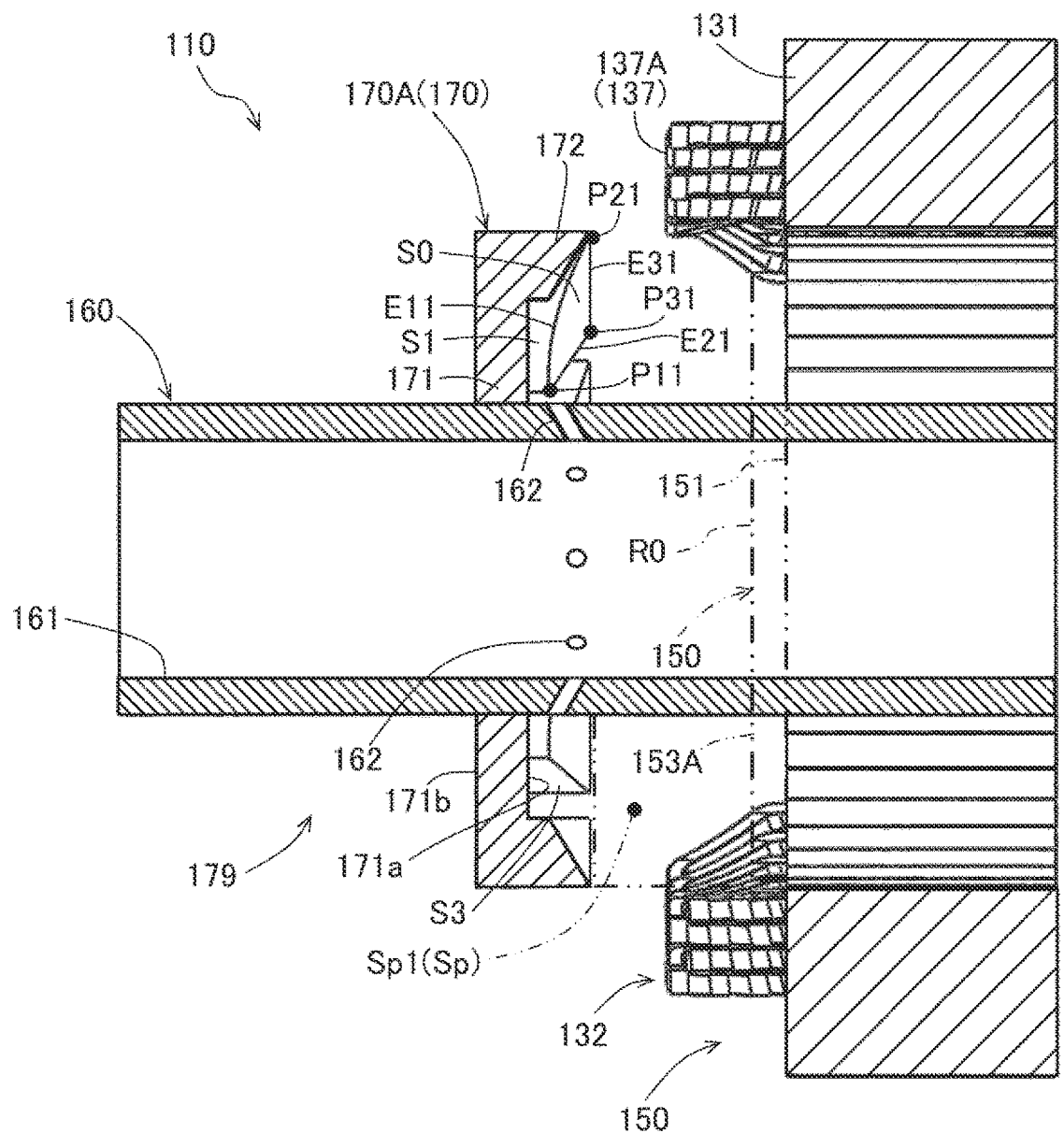
FIG. 5 is a schematic cross-sectional side view of the rotating electric machine illustrated in FIG. 2, and illustrates an arrangement relationship of a facing member, a communication hole, and a stator of the rotating electric machine according to the first embodiment.

As illustrated in FIGS. 4 and 5, a thickness (protrusion height) of the first blade portion 172 at the first tip point P11 is smaller than a thickness (protrusion height) of the first blade portion 172 at the second tip point P21. Note that the thickness of the first blade portion 172 at the first tip point P11 corresponds to a length in the axial direction from the end surface 171a of the disc portion 171 to the first tip point P11, and the thickness of the first blade portion 172 at the second tip point P21 corresponds to a length in the axial direction from the end surface 171a of the disc portion 171 to the second tip point P21.

A thickness (protrusion height) of the first blade portion 172 at the third tip point P31 is equal to a thickness of the first blade portion 172 at the second tip point P21. That is, the thickness of the first blade portion 172 at the first tip point P11 is smaller than the thickness of the first blade portion 172 at the third tip point P31. Note that the thickness of the first blade portion 172 at the third tip point P31 corresponds to a length in the axial direction from the end surface 171a of the disc portion 171 to the third tip point P31.

As described above, a thickness of the first blade portion 172 increases as it goes from the first tip point P11 toward the third tip point P31. That is, the first inclined surface S0 is inclined with respect to the radial direction of the rotor 150 such that a distance to an end surface (reference surface R0) of the rotor 150 becomes shorter from the inner side in the radial direction toward the outer side in the radial direction of the rotor 150. As will be described later, the first inclined surface S0 comes into contact with oil sprayed from the inner flow path 161 through the communication hole 162 by rotation of the shaft 160, and the oil is sprayed toward the coil end 137A of the coil 132.

Further, a thickness of the first blade portion 172 increases as it goes from the first tip point P11 toward the second tip point P21. That is, the first inclined surface S0 has a shorter distance from an end surface (reference surface R0) of the rotor 150 as it goes from one side to the other side in the circumferential direction of the rotor 150.

With this configuration, when the rotating body 179 rotates in the forward rotation direction R1, air flow toward an end surface of the rotor 150 can be effectively generated by the first inclined surface S0. Note that, when the rotor 150 and the rotating body 179 rotate in the forward rotation direction R1, a wheel rotates in a forward direction, and a vehicle moves forward. When the rotor 150 and the rotating body 179 rotate in a direction opposite to the forward rotation direction R1, a wheel rotates in a backward direction, and a vehicle moves backward.

As illustrated in FIG. 6, a plurality of the first blade portions 172 are arranged in the circumferential direction, so that a refrigerant flow path 178 that tapers more as it goes from the inner side in the radial direction to the outer side in the radial direction of the rotor 150 is formed between the first blade portions 172 adjacent in the circumferential direction of the rotor 150.

As illustrated in FIG. 5, the communication hole 162 is a linear through hole and has a circular cross section. The communication hole 162 is inclined with respect to the radial direction of the shaft 160 such that the oil outlet 1620 is arranged at a position closer to the disc portion 171 of the facing member 170 than the oil inlet 162i. That is, the communication hole 162 is inclined with respect to a plane orthogonal to the axial direction.

An extension line of a central axis of the communication hole 162 intersects the end surface 171a of the disc portion 171 between the first base end point P10 and the shaft 160. By the above, when the shaft 160 rotates, oil in the inner flow path 161 is sprayed from the communication hole 162 into a space between the first blade portion 172 and the shaft 160 in the disc portion 171.

Figure 7:
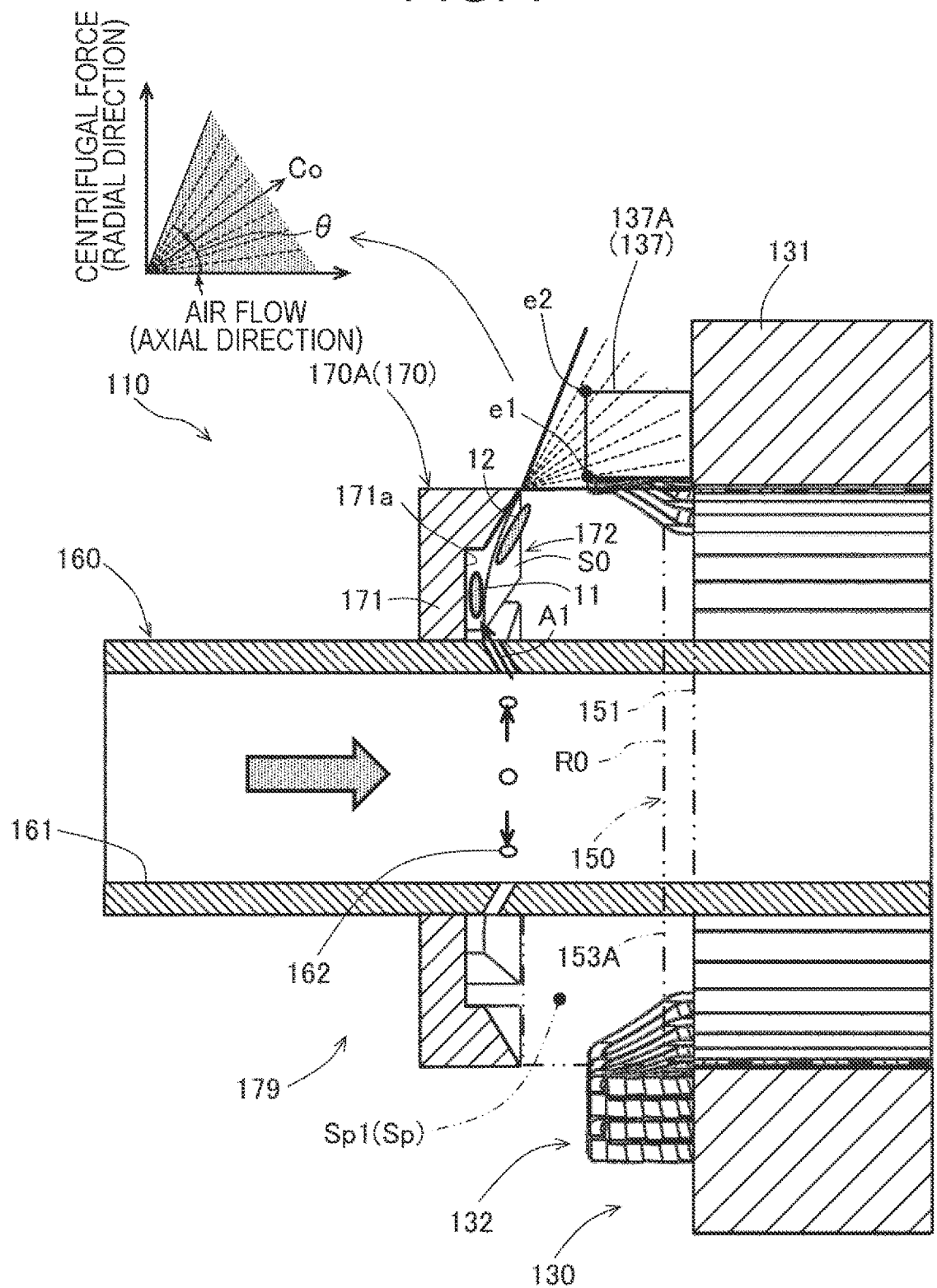
FIG. 7 is a schematic cross-sectional view of the rotating body, illustrating flow of oil sprayed from the communication hole.
Figure 8:
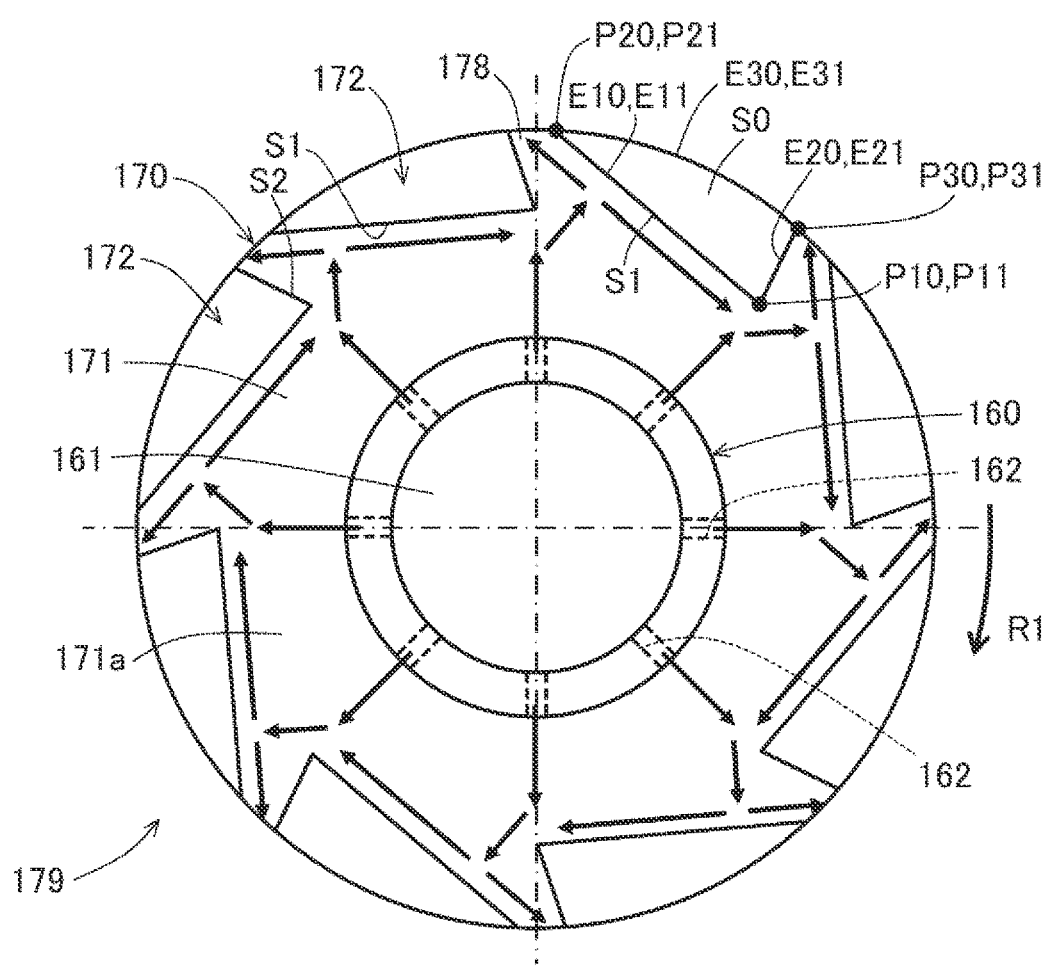
FIG. 8 is a schematic cross-sectional view of the rotating body as viewed from the axial direction, and illustrates flow of oil sprayed from the communication hole in a case where the rotating body rotates in a forward rotation direction R1.

An example of flow of oil introduced into the inner flow path 161 of the shaft 160 and sprayed from the communication hole 162 will be described with reference to FIGS. 7 and 8. FIG. 7 is a schematic cross-sectional view of the rotating body 179, illustrating flow of oil sprayed from the communication hole 162. FIG. 8 is a schematic cross-sectional view of the rotating body 179 as viewed from the axial direction, and illustrates flow of oil sprayed from the communication hole 162 in a case where the rotating body 179 rotates in the forward rotation direction R1.

As illustrated in FIG. 7, oil introduced into the inner flow path 161 of the shaft 160 is sprayed to the outside of the shaft 160 through a plurality of the communication holes 162 by centrifugal force generated by rotation of the rotating body 179 (see arrow A1). Oil (refrigerant) is sprayed from the communication hole 162 into a space between the first blade portion 172 and the shaft 160. Oil (refrigerant) flows on the end surface 171a of the disc portion 171 to form a liquid film (oil film) 11.

As illustrated in FIG. 8, oil on the end surface 171a flows toward the outer side in the radial direction by centrifugal force and collides with the first side surface S1 of the first blade portion 172, and a part of the oil flows along the first side surface S1. A part of oil in contact with the first side surface S1 flows toward the first base end point P10 side or the second base end point P20 side along the first side surface S1.

A part of oil flowing to the first base end point P10 side along the first side surface S1 flows toward an adjacent one of the first blade portions 172 and collides with the first side surface S1 of the first blade portion 172. Oil flowing to the second base end point P20 side along the first side surface S1 is sprayed from the tapered refrigerant flow path 178 toward the outer side in the radial direction of the facing member 170.

Oil flowing on the end surface 171a collides with the first side surface S1 of the first blade portion 172 and changes its direction. Further, a part of oil sprayed from a predetermined one of the communication holes 162 merges with a part of oil sprayed from the communication hole 162 different from the predetermined one of the communication holes 162 on the end surface 171a. As described above, by providing a plurality of the first blade portions 172 along the circumferential direction, flow of oil on the end surface 171a constantly fluctuates.

By the above, oil on the end surface 171a is divided from the liquid film 11 into a liquid column or a liquid droplet, and is vigorously sprayed from the tapered refrigerant flow path 178. Oil divided into a large number of small droplets flows in the axial direction by air flow. In the present embodiment, due to rotation of the shaft 160, the liquid film 11 on the end surface 171a of the disc portion 171 is sprayed toward the coil end 137A in a form of a large number of small droplets (particulate oil), that is, mist.

Further, as illustrated in FIG. 7, a part of oil on the end surface 171a flows onto the first inclined surface S0. By the above, a liquid film (oil film) 12 is formed on the first inclined surface S0. Oil on the first inclined surface S0 is sprayed from the first inclined surface S0 as a liquid column or a droplet divided from the liquid film 12 by centrifugal force. Oil divided into a large number of small droplets flows in the axial direction by air flow. In the present embodiment, due to rotation of the shaft 160, the liquid film 12 on the first inclined surface S0 is sprayed toward the coil end 137A in a form of a large number of small droplets (particulate oil), that is, mist.

In the present embodiment, as schematically illustrated in FIG. 7, oil is sprayed over a wide range from the first inclined surface S0 of the facing member 170. In a case where an angle formed by a central axis Co in a range of oil sprayed from the first inclined surface S0 and the axial direction is defined as a spray angle θ, the spray angle θ is determined by a shape of the first inclined surface S0, a flow velocity of air flow, and the magnitude of centrifugal force. The spray angle θ becomes smaller as a flow velocity of air flow is larger, and the spray angle θ becomes larger as centrifugal force is larger.

In the present embodiment, the first blade portion 172 is formed such that oil sprayed from the first inclined surface S0 comes into contact with a range from an inner peripheral side end portion e1 to an outer peripheral side end portion e2 of the coil end 137A when the shaft 160 rotates at a predetermined rotation speed.

Since oil can be adhered to the coil end 137A of the coil 132 arranged in a housing portion (the first layer L1 to the fourth layer L4) of each coil conductor, a temperature rise of the coil end 137A can be effectively prevented.

Figure 9:
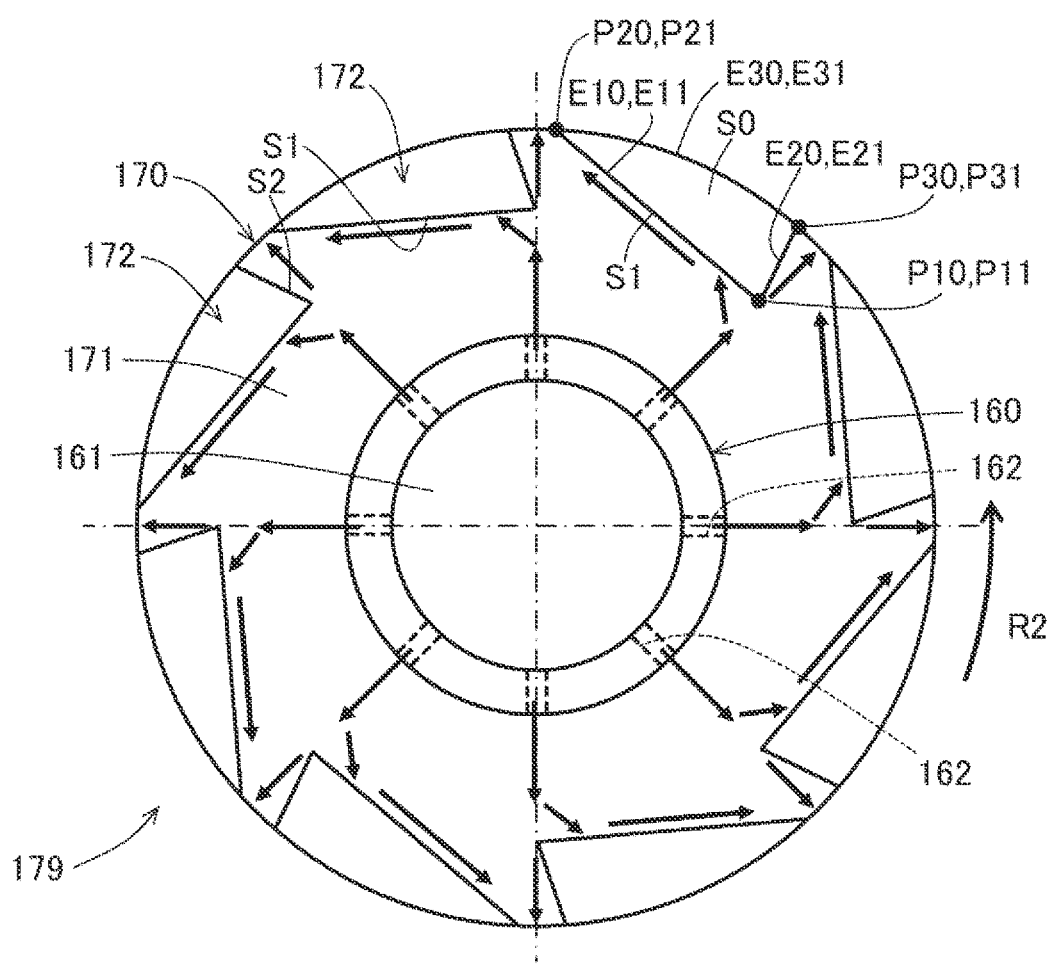
FIG. 9 is a schematic cross-sectional view of the rotating body as viewed from the axial direction, and illustrates flow of oil sprayed from the communication hole in a case where the rotating body rotates in a reverse rotation direction R2.

Note that, in the example illustrated in FIG. 8, the case where the rotor 150 and the rotating body 179 rotate in the forward rotation direction R1 is described. On the other hand, as illustrated in FIG. 9, in a case where the rotor 150 and the rotating body 179 rotate in the reverse rotation direction R2 (the direction opposite to the forward rotation direction R1), that is, in a case where vehicle moves backward, momentum of air flow toward the rotor 150 becomes weak as compared with a case where the facing member 170 rotates in the forward rotation direction R1. However, as in the case where the facing member 170 rotates in the forward rotation direction R1, oil sprayed onto the end surface 171a of the disc portion 171 collides with the first side surface S1 of the first blade portion 172, flows along the first side surface S1, and is split into small droplets to be sprayed.

For this reason, in a case where the facing member 170 rotates in the reverse rotation direction R2, cooling performance is lowered as compared with a case where the facing member 170 rotates in the forward rotation direction R1, but the coil end 137 can be effectively cooled as compared with a rotating electric machine not including the facing member 170.

According to the above-described embodiment, a function and an effect below are obtained.

(1) The stator 130 having the stator core 131 and the coil 132 mounted on the stator core 131, the rotor 150 arranged with the stator 130 with a gap between them, the shaft 160 connected to the rotor 150, and the facing member 170 fixed to the shaft 160 and facing an end surface (reference surface R0) in the axial direction of the rotor 150 via the space Sp. The shaft 160 has the inner flow path 161 through which oil (refrigerant) flows, and the communication hole 162 that allows the inner flow path 161 to communicate with the space Sp. The facing member 170 includes a plurality of the first blade portions 172 arranged along the circumferential direction of the rotor 150.

The first blade portion 172 has the first inclined surface S0 that is inclined with respect to the radial direction of the rotor 150 such that a distance to an end surface (reference surface R0) of the rotor 150 becomes shorter from the inner side in the radial direction toward the outer side in the radial direction of the rotor 150. The first inclined surface S0 comes into contact a with refrigerant sprayed from the inner flow path 161 through the communication hole 162 by rotation of the shaft 160, and sprays the refrigerant toward the coil end 137 of the coil 132.

According to this configuration, when the rotor 150, the shaft 160, and the facing member 170 rotate integrally, oil in the inner flow path 161 of the shaft 160 is sprayed to the outside of the shaft 160 through the communication hole 162 by centrifugal force. Oil sprayed from the communication hole 162 comes into contact with the facing member 170.

A part of oil in contact with the facing member 170 flows along a side surface of the first blade portion 172 and is sprayed as a droplet to the outer side in the radial direction of the facing member 170. Further, a part of oil in contact with the facing member 170 is sprayed from the first inclined surface S0 of the first blade portion 172 toward the coil end 137, and the oil adheres to the coil end 137. As described above, in the present embodiment, oil is sprayed from the first inclined surface S0, and oil is sprayed from a space between adjacent ones of the first blade portions 172.

Further, since a plurality of the first blade portions 172 are provided along the circumferential direction, air flow is generated in the axial direction when the facing member 170 rotates. Therefore, oil sprayed from the communication hole 162 and brought into contact with the facing member 170 is atomized by centrifugal force, and the atomized oil is sprayed in a wide range by centrifugal force and air flow. By the above, oil is adhered over a wide range of the coil end 137, and the coil end 137 is effectively cooled.

(2) The first inclined surface S0 sprays atomized oil (refrigerant) toward the coil end 137 by rotation of the rotating body 179 (the shaft 160 and the facing member 170). By the above, a refrigerant can be adhered in a wider range to the coil end 137, so that the coil end 137 can be cooled more effectively.

(3) The first blade portion 172 is formed such that oil (refrigerant) sprayed from the first inclined surface S0 by rotation of the rotating body 179 (the shaft 160 and the facing member 170) comes into contact with a range from the inner peripheral side end portion e1 to the outer peripheral side end portion e2 of the coil end 137. By the above, the coil 132 arranged in the layers L1 to L4 can be effectively cooled.

(4) A plurality of the first blade portions 172 generate air flow toward an end surface of the rotor 150 by rotation of the shaft 160. In the present embodiment, the first inclined surface S0 has a shorter distance from an end surface (reference surface R0) of the rotor 150 as it goes from one side (forward side in the forward rotation direction R1) toward the other side (opposite side to the forward side in the forward rotation direction R1) in the circumferential direction. With this configuration, air flow can be more effectively generated by rotation in the forward rotation direction R1 of the shaft 160. By generation of air flow from the facing member 170 toward an end surface of the rotor 150, oil sprayed from the facing member 170 is effectively dispersed in the air and attached to the coil end 137. As a result, the coil end 137 can be effectively cooled.

(5) The facing member 170 includes the disc portion 171 having a disc shape and the first blade portion 172 protruding from the disc portion 171 toward an end surface of the rotor 150. The communication hole 162 sprays oil (refrigerant) to a space between the first blade portion 172 of the disc portion 171 and the shaft 160. According to this configuration, oil sprayed on the end surface 171a of the disc portion 171 flows toward the first blade portion 172 and collides with the first blade portion 172, and is guided toward the outside of the facing member 170 by the first blade portion 172. By the above, the liquid film 11 on the end surface 171a can be effectively divided into droplets and formed into mist.

(6) The first blade portion 172 includes the first base end point (first end point) P10 located further on the inner side in the radial direction than the outer peripheral surface 171c of the disc portion 171, the second base end point (second end point) P20 located on the outer peripheral surface 171c of the disc portion 171, the third base end point (third end point) P30 located on an outer peripheral surface of the disc portion 171, the base end side long side (long side) E10 connecting the first base end point P10 and the second base end point P20, the base end side short side (short side) E20 connecting the first base end point P10 and the third base end point P30, the first side surface S1 connecting the base end side long side E10 and the first inclined surface S0, and the second side surface S2 connecting the base end side short side E20 and the first inclined surface S0. The base end side long side E10 is longer than the base end side short side E20. Further, the sum of lengths of the base end side long sides E10 of a plurality of the first blade portions 172 provided in the facing member 170 is longer than a length of an outer periphery of the facing member 170.

As described above, since a length of the base end side long side E10 is set, a flow path length of oil sprayed onto the end surface 171a of the disc portion 171 can be sufficiently secured, and the liquid film 11 on the end surface 171a can be efficiently divided into droplets and atomized.

(7) A plurality of the communication holes 162 are formed along the circumferential direction of the shaft 160. The communication hole 162 has the oil inlet (refrigerant inlet) 162i formed on an inner peripheral surface of the shaft 160 and the oil outlet (refrigerant outlet) 162o formed on an outer peripheral surface of the shaft 160. The communication hole 162 is inclined with respect to the radial direction of the shaft 160 such that the oil outlet 162o is arranged at a position closer to the disc portion 171 of the facing member 170 than the oil inlet 162i.

By the above, oil (refrigerant) can be effectively sprayed to the facing member 170. As described above, oil sprayed to the facing member 170 is sprayed toward the coil end 137 by centrifugal force and air flow.

(8) The refrigerant flow path 178 that tapers more as it goes from the inner side in the radial direction to the outer side in the radial direction of the rotor 150 is formed between the first blade portions 172 adjacent in the circumferential direction of the rotor 150. By the above, oil (refrigerant) flowing on the end surface 171a of the disc portion 171 can be atomized and vigorously sprayed from a tip portion of the refrigerant flow path 178.

(9) As described above, according to the present embodiment, it is possible to effectively cool the coil 132 by atomizing oil and spraying the oil (refrigerant) to the coil end 137 in a wide range. As a result, a temperature rise of the permanent magnet 152 due to heat generation of the coil 132 can be effectively reduced.

Here, a use amount of the permanent magnet 152 is determined by a residual magnetic flux density Br and a holding force. A use amount of the permanent magnet 152 can be reduced as the residual magnetic flux density Br and the holding force are higher. The residual magnetic flux density Br and the holding force of the permanent magnet 152 decrease as the temperature increases. In the present embodiment, oil (refrigerant) can be sprayed in a wide range to the coil end 137 to effectively cool the coil end 137. By the above, a temperature of the permanent magnet 152 can be kept low. Therefore, according to the present embodiment, a usage amount of the permanent magnet 152 can be reduced. Further, the permanent magnet 152 that is inexpensive can also be employed. As a result, cost of the rotating electric machine 110 can be reduced.

(10) Further, since oil (refrigerant) adheres to the coil end 137, it is possible to reduce a temperature rise of the entire coil 132, so that winding resistance is reduced and AC copper loss can be reduced. In the present embodiment, simulation analysis under a predetermined operating condition has confirmed that AC copper loss can be reduced by about 10% by provision of the facing member 170. As described above, according to the present embodiment, AC copper loss can be reduced, and efficiency of the rotating electric machine 110 can be improved. Further, it is also possible to achieve reduction in size of the rotating electric machine 110 in the axial direction while maintaining efficiency of the rotating electric machine 110.

Second Embodiment

A rotating electric machine 210 according to a second embodiment of the present invention will be described with reference to FIGS. 10 and 11. Note that, in the diagram, the same or corresponding portion as that of the first embodiment is denoted by the same reference numeral, and a difference will be mainly described.

Figure 10:
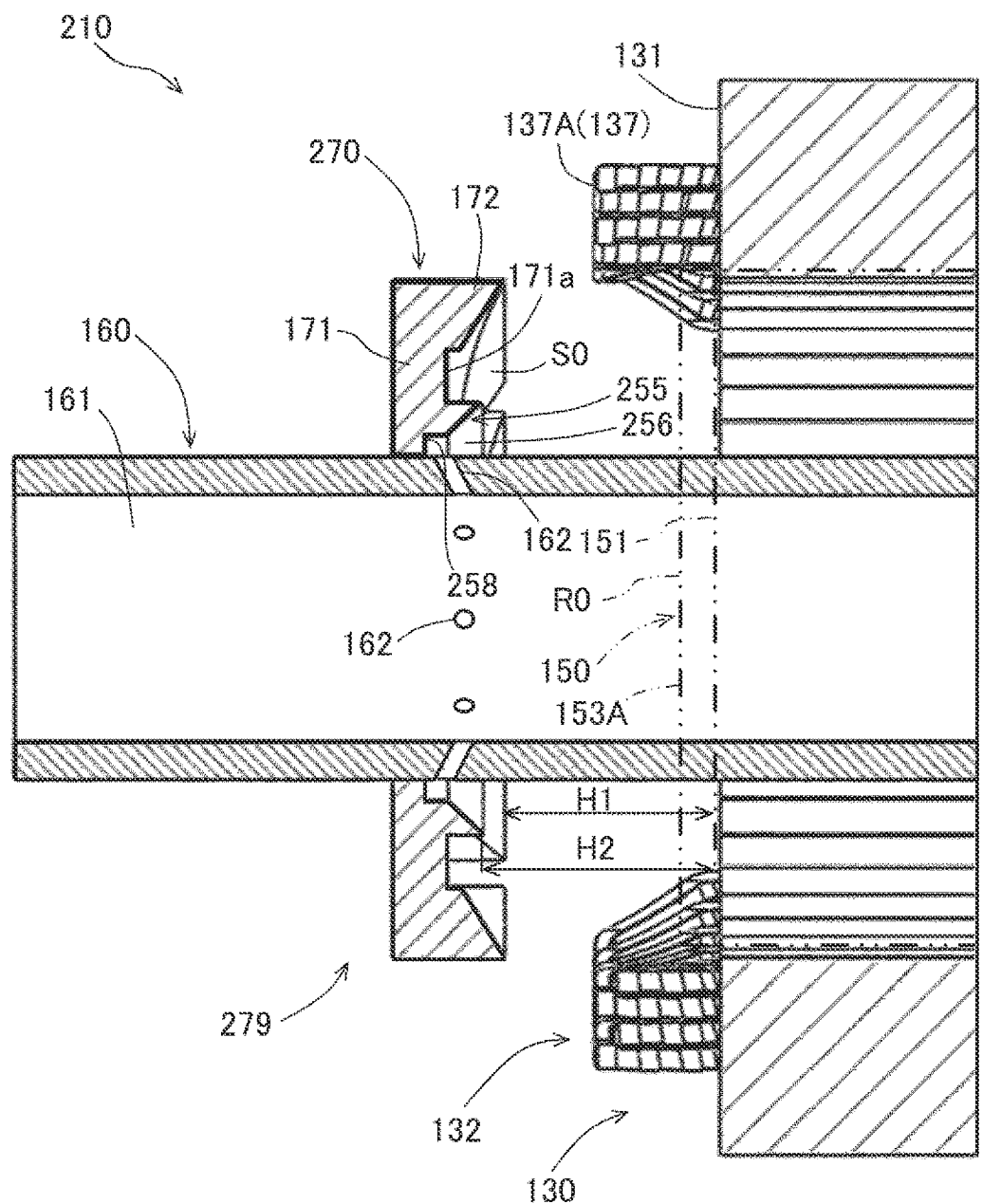
FIG. 10 is a schematic cross-sectional side view of the rotating electric machine according to a second embodiment, and illustrates an arrangement relationship of a facing member, a communication hole, and a stator of the rotating electric machine according to the second embodiment.

FIG. 10 is a schematic cross-sectional side view of the rotating electric machine 210 according to the second embodiment, and illustrates an arrangement relationship of a facing member 270, the communication hole 162, and the stator 130 of the rotating electric machine 210 according to the second embodiment. FIG. 11 is a perspective view of a rotating body 279 of the rotating electric machine 210 according to the second embodiment.

Figure 11:
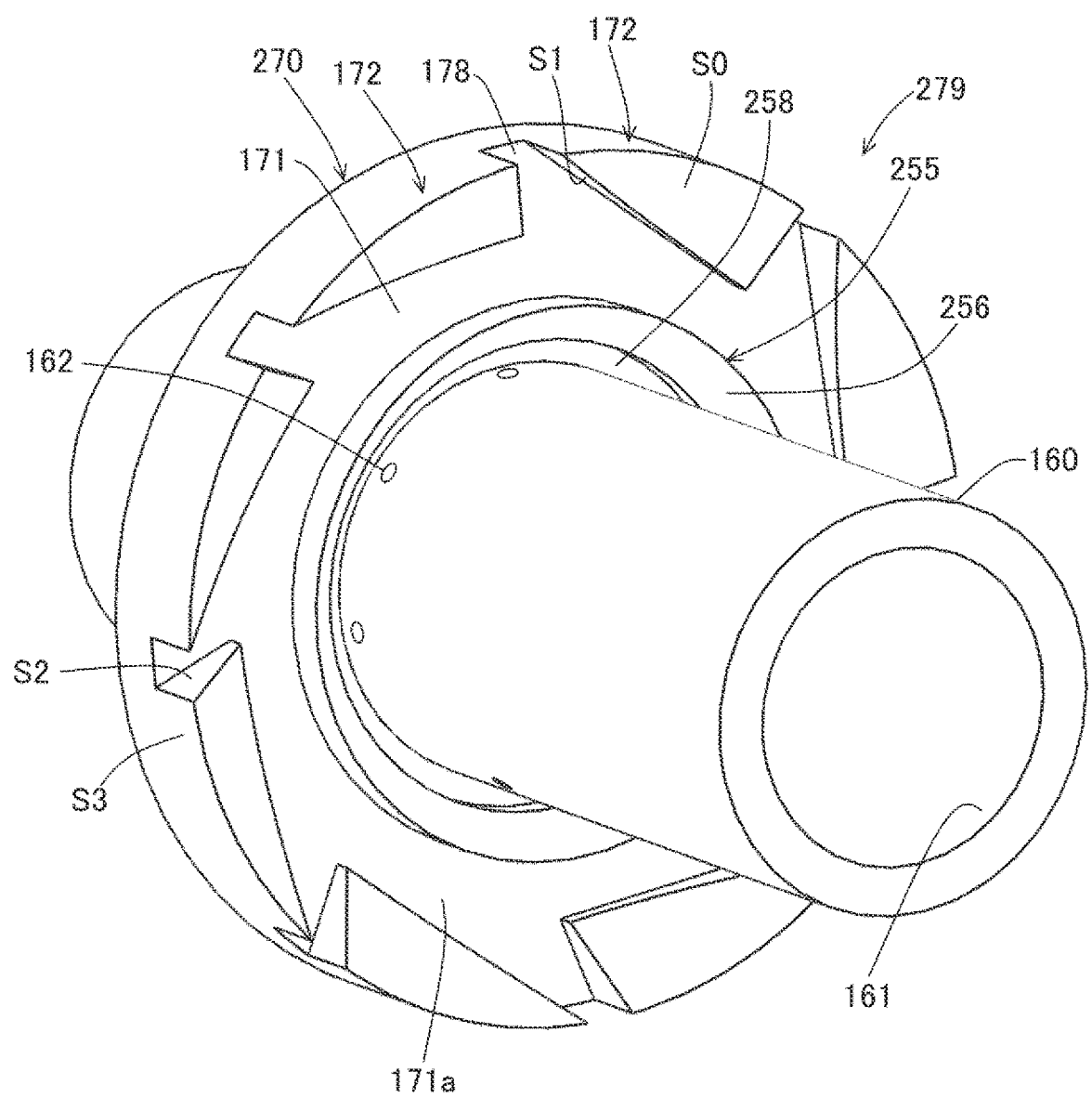
FIG. 11 is a perspective view of a rotating body of the rotating electric machine according to the second embodiment.

As illustrated in FIGS. 10 and 11, the facing member 270 of the rotating electric machine 210 according to the second embodiment includes a second blade portion 255 that protrudes in the axial direction from the end surface 171a of the disc portion 171 toward an end surface (reference surface R0) of the rotor 150 further on the inner side in the radial direction of the rotor 150 than the first blade portion 172 arranged along an outer periphery. Details will be described below.

The facing member 270 according to the second embodiment includes the disc portion 171 having a disc shape, the first blade portion 172 protruding from the end surface 171a of the disc portion 171 toward an end surface (reference surface R0) of the rotor 150, and the second blade portion 255 protruding from the end surface 171a of the disc portion 171 toward an end surface (reference surface R0) of the rotor 150. The second blade portion 255 is provided along the circumferential direction of the rotor 150. The second blade portion 255 according to the present embodiment has an annular shape when viewed from the axial direction.

A thickness (length in the axial direction) of the second blade portion 255 from the end surface 171a of the disc portion 171 increases as it goes from the inner side in the radial direction toward the outer side in the radial direction of the disc portion 171. The second blade portion 255 has a second inclined surface 256 that is inclined with respect to the radial direction of the rotor 150 such that a distance to an end surface (reference surface R0) of the rotor 150 becomes shorter from the inner side in the radial direction toward the outer side in the radial direction of the rotor 150.

A protrusion height from the end surface 171a of the second blade portion 255 is smaller than a protrusion height from the end surface 171a of the first blade portion 172. For this reason, a shortest distance H2 in the axial direction from the second inclined surface 256 of the second blade portion 255 to an end surface (reference surface R0) of the rotor 150 is longer than a shortest distance H1 in the axial direction from the first inclined surface S0 of the first blade portion 172 to an end surface (reference surface R0) of the rotor 150.

A groove portion 258 recessed from the end surface 171a of the disc portion 171 is formed between the second blade portion 255 and the shaft 160. The communication hole 162 is formed such that the groove portion 258 is arranged on an extension line of a central axis of the communication hole 162, and oil is sprayed into the groove portion 258 by centrifugal force during rotation of the shaft 160.

In the second embodiment, oil sprayed from the communication hole 162 is introduced into the groove portion 258. Oil introduced into the groove portion 258 flows along the second inclined surface 256 of the second blade portion 255 by centrifugal force and is sprayed to the outer side in the radial direction from the second inclined surface 256.

A part of oil sprayed from the second inclined surface 256 is sprayed to the first inclined surface S0 of the first blade portion 172. Further, a part of oil sprayed from the second inclined surface 256 is sprayed to the end surface 171a of the disc portion 171. As in the first embodiment, a part of oil sprayed to the end surface 171a of the disc portion 171 is sprayed from the refrigerant flow path 178 toward the outer side in the radial direction of the facing member 170. Further, a part of oil sprayed to the end surface 171a of the disc portion 171 flows to the first inclined surface S0 of the first blade portion 172. As in the first embodiment, oil on the first inclined surface S0 of the first blade portion 172 is sprayed toward the outer side in the radial direction of the facing member 170.

As described above, in the second embodiment, the second blade portion 255 having a smaller protrusion height than the first blade portion 172 is provided on the inner side of the first blade portion 172. For this reason, after dispersion of oil is promoted by the second blade portion 255, the dispersion of the oil is further promoted by the first blade portion 172. Therefore, according to the second embodiment, oil is sprayed in a wider range than the first embodiment, and the coil 132 can be effectively cooled.

Variations below are also within the scope of the present invention, and it is also possible to combine a configuration illustrated in a variation with a configuration described in the above-described embodiment, combine configurations described in different ones of the above-described embodiments, or combine configurations described in different ones of the variations below.

First Variation

In the above embodiment, the example (see FIG. 7) in which oil (refrigerant) is sprayed to a range from the inner peripheral side end portion e1 to the outer peripheral side end portion e2 of the coil end 137 is described, but the present invention is not limited to this.

An amount of AC copper loss is larger for a coil conductor located further on the inner peripheral side of the stator 130. For this reason, the configuration may be such that oil is sprayed only to a coil conductor located on the inner peripheral side of the stator 130, for example, only to the coil end 137 of the coil 132 arranged in the first layer L1 and the second layer L2 illustrated in FIG. 3. By the above, it is possible to effectively cool the coil 132 as compared with a case where oil is sprayed only to an inner peripheral surface of the coil end 137.

Second Variation

In the above embodiment, the example in which the first inclined surface S0 is formed such that a distance from the reference surface R0 becomes shorter as it goes from one side toward the other side in the circumferential direction is described, but the present invention is not limited to this. The first inclined surface S0 may have a constant distance from the reference surface R0 from one side to the other side in the circumferential direction.

Third Variation

In the above embodiment, the example in which the sum of lengths of the base end side long sides E10 of a plurality of the first blade portions 172 is longer than a length of an outer periphery of the facing member 170 is described, but the present invention is not limited to this. The sum of lengths of the base end side long sides E10 of a plurality of the first blade portions 172 may be equal to or less than a length of an outer periphery of the facing member 170.

Fourth Variation

In the above embodiment, the example in which the first blade portion 172 is formed in a triangular prism shape is described, but the present invention is not limited to this. The first blade portion 172 may be formed in a polygonal columnar shape such as a quadrangular prism shape, or may be formed in a shape in which a side surface is a curved surface such as a cylinder shape or an elliptic cylinder shape.

Since an inclined surface (tip surface) of the first blade portion having a columnar shape is formed such that a distance to an end surface (reference surface R0) of the rotor 150 decreases as it goes from the inner side in the radial direction toward the outer side in the radial direction, oil can be sprayed toward the coil end 137. Further, since an inclined surface (tip surface) of the first blade portion having a columnar shape is formed such that a distance to an end surface (reference surface R0) of the rotor 150 decreases as it goes from one side toward the other side in the circumferential direction, air flow can be effectively generated.

Fifth Variation

In the above embodiment, the example in which a thickness of the facing member 170 in a portion where the first blade portion 172 is provided is larger than a thickness of the facing member 170 in a portion where the first blade portion 172 is not provided is described, but the present invention is not limited to this. The facing member may be formed to have a substantially constant thickness by, for example, pressing a flat plate.

Sixth Variation

In the above embodiment, the example in which the motor housing 191 housing the rotating electric machine 110 and the inverter housing 197 housing the inverter 120 are formed by integral molding is described, but the present invention is not limited to this. The motor housing 191 and the inverter housing 197 may be integrated by being fastened by a fastening member such as a bolt or a nut. Note that, in the above embodiment, since the motor housing 191 and the inverter housing 197 are integrally molded, work of fastening the motor housing 191 and the inverter housing 197 by a fastening member is unnecessary. For this reason, according to the above embodiment, the number of assembling man-hours of the electric drive system 10 can be reduced as compared with the present variation.

Seventh Variation

In the above embodiment, the example in which oil is scraped up by operation of the speed reducer 180 and a differential gear and introduced into a reservoir tank, and oil in the reservoir tank is supplied into the inner flow path 161 of the shaft 160 by gravity is described, but the present invention is not limited to this.

For example, the electric drive system 10 may be configured such that a pump (not illustrated) provided outside the housing 190 sucks and discharges oil in a tank (not illustrated), and oil discharged from the pump is guided to the inner flow path 161 of the shaft 160.

Eighth Variation

In the above embodiment, the example in which a pair of the facing members 170 are provided on both sides in the axial direction of the rotor 150 is described, but the present invention is not limited to this. The configuration may be such that the facing member 170 is provided only on one side in the axial direction of the rotor 150.

Ninth Variation

A position of the first blade portion 172 and a position of the communication hole 162 are not limited to the positions described in the above embodiment. A plurality of the first blade portions 172 may be formed at unequal intervals along the circumferential direction of the facing member 170. Similarly, a plurality of the communication holes 162 may be formed at unequal intervals along the circumferential direction of the shaft 160.

Tenth Variation

The number of the first blade portions 172 and the number of the communication holes 162 are not limited to the numbers described in the above embodiment. At least two of the first blade portions 172 need to be formed on the first facing member 170A. Further, at least one of the communication hole 162A for spraying oil to the first facing member 170A needs to be provided. Similarly, at least two of the first blade portions 172 need to be formed on the second facing member 170B. Further, at least one of the communication hole 162B for spraying oil to the second facing member 170B needs to be provided.

Note that, as described above, the number of the first blade portions 172, the number of the first communication holes 162A, and the number of the second communication holes 162B are preferably the same as the number of magnetic poles of the rotating electric machine 110. By the above, oil (refrigerant) can be uniformly sprayed over the entire circumference of the coil end 132.

Eleventh Variation

In the above embodiment, an example in which the communication hole 162 is inclined with respect to the radial direction is described, but the present invention is not limited to this. The communication hole 162 may be formed in parallel with the radial direction. In this case, as the communication hole 162 is provided in the vicinity of the facing member 170, oil sprayed from the communication hole 162 can be attached to the facing member 170.

Twelfth Variation

Figure 12:
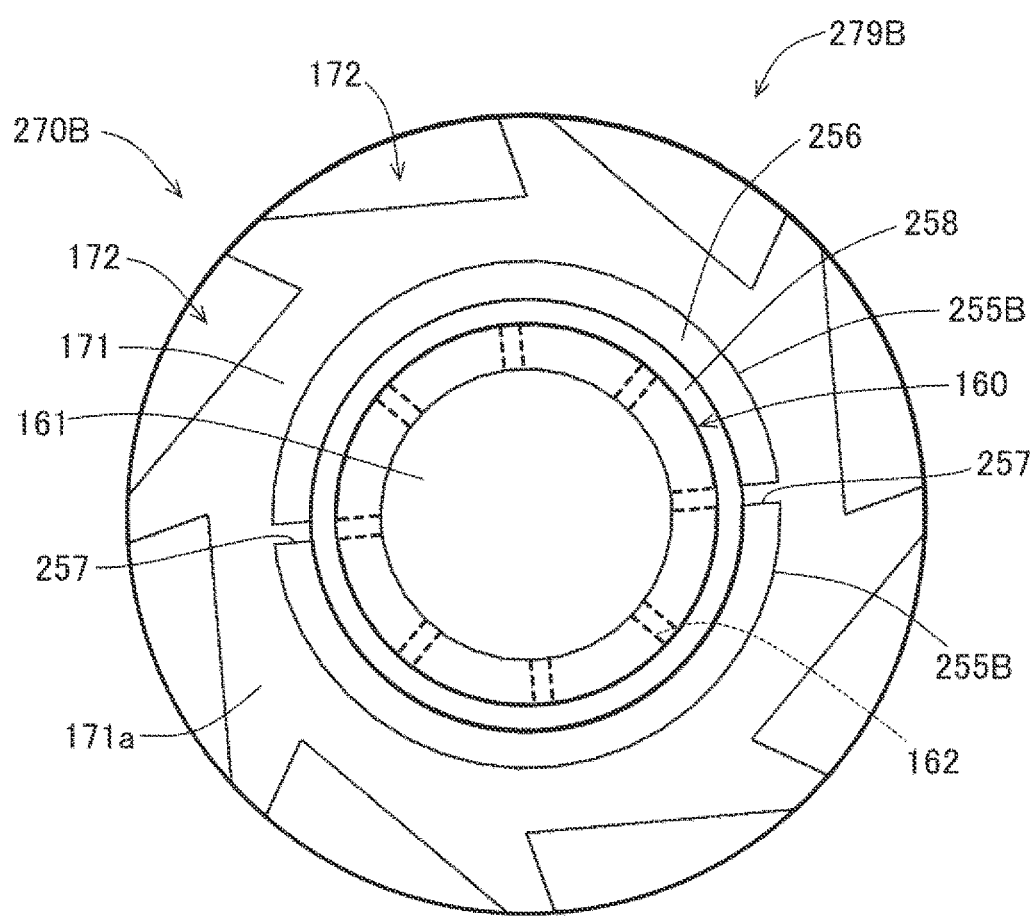
FIG. 12 is a diagram of the rotating body of the rotating electric machine according to a variation of the second embodiment as viewed from the axial direction.

In the second embodiment, the example in which the second blade portion 255 is continuously provided around the shaft 160 is described, but the present invention is not limited to this. A facing member 270B of the rotating electric machine according to a variation of the second embodiment will be described with reference to FIG. 12. FIG. 12 is a diagram of a rotating body 279B of the rotating electric machine according to a variation of the second embodiment as viewed from the axial direction. As illustrated in FIG. 12, a plurality of second blade portions 255B of the facing member 270B according to the present variation are formed along the circumferential direction. The second blade portion 255B has an arc shape when viewed from the axial direction.

In the present variation, a pair of the second blade portions 255B having a semicircular arc shape are provided. A discharge flow path 257 for discharging oil in the groove portion 258 to the outer side in the radial direction is formed between a pair of adjacent ones of the second blade portions 255B. The discharge flow path 257 is a recessed flow path formed by an end surfaces in the circumferential direction of a pair of the second blade portions 255B facing each other and the end surface 171a of the disc portion 171.

A pair of the discharge flow paths 257 is arranged so as to face each other in the radial direction with the shaft 160 interposed between them. That is, with respect to one of the discharge flow paths 257, the other one of the discharge flow paths 257 is provided on the opposite side by 180° around the rotation axis O.

According to the present variation, oil sprayed from the communication hole 162 is introduced into the groove portion 258, and a part of oil in the groove portion 258 flows along the circumferential direction and is discharged from the discharge flow path 257 toward the first blade portion 172. Further, similarly to the second embodiment, a part of oil in the groove portion 258 flows toward the second inclined surface 256 of the second blade portion 255B by centrifugal force and is sprayed to the outer side in the radial direction from the second inclined surface 256. Oil sprayed from the second inclined surface 256 flows on the first inclined surface S0 of the first blade portion 172 and around the first blade portion 172, and is sprayed toward the coil end 137 as in the first embodiment.

In the present variation, the facing member 270B includes the disc portion 171 having a disc shape, the first blade portion 172 protruding from the end surface 171a of the disc portion 171 toward an end surface (reference surface R0) of the rotor 150, and the second blade portion 255B protruding from the end surface 171a of the disc portion 171 toward an end surface (reference surface R0) of the rotor 150. A plurality of the second blade portions 255B are formed along the circumferential direction, and have an arc shape when viewed from the axial direction of the rotor 150. The groove portion 258 recessed from the end surface 171a of the disc portion 171 is formed between the second blade portion 255B and the shaft 160. The communication hole 162 sprays oil (refrigerant) into the groove portion 258. The discharge flow path 257 for discharging oil (refrigerant) in the groove portion 258 toward the first blade portion 172 is formed between adjacent ones of the second blade portions 255B.

As described above, according to the present variation, oil in the groove portion 258 is vigorously discharged from the discharge flow path 257 toward the outer side in the radial direction, dispersion of oil can be promoted. By the above, atomization of oil can be promoted more than that in the second embodiment.

Note that, in the present variation, the example in which two of the discharge flow paths 257 are provided is described, but the number of the discharge flow paths 257 may be one, or three or more.

Thirteenth Variation

In the second embodiment, the example in which the groove portion 258 recessed from the end surface 171a of the disc portion 171 is formed between the second blade portion 255 and the shaft 160 (see FIG. 10) is described, but the present invention is not limited to this. The groove portion 258 may be omitted.

Fourteenth Variation

In the above embodiment, the example in which the rotating electric machine 110 functions as an electric motor and a generator is described, but the present invention is not limited to this. The present invention can be applied to a rotating electric machine that functions only as an electric motor, or can be applied to a rotating electric machine that functions only as a generator.

Fifteenth Variation

In the above embodiment, the example in which the coil 132 is wound around the stator core 131 by distributed winding is described, but the winding method is not limited to this. The coil 132 may be wound around the stator core 131 by concentrated winding. Further, the coil 132 is not limited to be formed of a flat wire, and may be formed of a round wire.

Sixteenth Variation

In the above embodiment, the example in which one field pole is formed by the permanent magnet 152 embedded in one of the magnet insertion holes 153 is described, but the present invention is not limited to this. One field pole may be formed by the permanent magnet 152 embedded in a plurality of the magnet insertion holes 153.

For example, the present invention may be applied to a rotating electric machine in which one field pole is formed by provision of a pair of the permanent magnets 152 having a V shape whose outer side in the radial direction is opened when viewed from the axial direction. Further, the present invention may be applied to a rotating electric machine in which one field pole is formed by further provision of one permanent magnet between a pair of the permanent magnets 152 having a V shape. Note that the permanent magnet 152 may be divided into a plurality of parts in the axial direction.

Seventeenth Variation

In the above embodiment, the example in which the rotating electric machine 110 is an interior permanent magnet (IPM) rotating electric machine in which the permanent magnet 152 is embedded in the magnet insertion hole 153 of the rotor core 151 is described, but the present invention is not limited to this. The present invention may be applied to a surface permanent magnet (SPM) rotating electric machine in which the permanent magnet 152 is fixed to a recess on a side surface of the rotor core 151. Further, the rotating electric machine 110 is not limited to a synchronous machine (SM), and may be an induction machine (IM).

Eighteenth Variation

In the above embodiment, the rotating electric machine 110 used as a power source for traveling of an automobile is described as an example, but the present invention is not limited to this. The present invention can be applied to a rotating electric machine used as a power source of a moving body such as an elevator or a railway vehicle. Note that the rotating electric machine 110 is not limited to a case of being mounted on a moving body.

Nineteenth Variation

The number of magnetic poles and the number of slots of the rotating electric machine 110 are not limited to the example described in the above embodiment.

Although the embodiment of the present invention is described above, the above embodiment merely illustrates a part of an application example of the present invention, and the technical scope of the present invention is not intended to be limited to the specific configuration of the above embodiment.

REFERENCE SIGNS LIST 10 electric drive system
110 rotating electric machine
130 stator
131 stator core
132 coil
137 coil end
150 rotor
151 rotor core
152 permanent magnet
153A, 153B end plate
160 shaft
161 inner flow path
162 communication hole
162i oil inlet (refrigerant inlet)
162o oil outlet (refrigerant outlet)
170 facing member
171 disc portion
171a end surface
171c outer peripheral surface
172 first blade portion
178 refrigerant flow path
179 rotating body
180 speed reducer
190 housing
191 motor housing
197 inverter housing
198 gear housing
210 rotating electric machine
255, 255B second blade portion
256 second inclined surface
257 discharge flow path
258 groove portion
270, 270B facing member
279, 279B rotating body
e1 inner peripheral side end portion
e2 outer peripheral side end portion
E10 base end side long side (long side)
E11 tip side long side
E20 base end short side (short side)
E21 tip side short side
E30 base end side imaginary line
E31 tip side arc side
O rotation axis (rotation center axis)
P10 first base end point (first end point)
P11 first tip point
P20 second base end point (second end point)
P21 second tip point
P30 third base end point (third end point)
P31 third tip point
R0 reference surface (end surface in axial direction of rotor)
S0 first inclined surface
S1 first side surface
S2 second side surface
S3 third side surface
Sp space

The invention claimed is:

1. A rotating electric machine comprising:
a stator including a stator core and a coil mounted on the stator core;
a rotor arranged with the stator with a gap interposed therebetween;
a shaft connected to the rotor; and
a facing member fixed to the shaft and facing an end surface in an axial direction of the rotor with a space interposed therebetween,
wherein the shaft includes
an inner flow path through which a refrigerant flows, and
a communication hole that allows the inner flow path to communicate with the space,
the facing member includes a plurality of first blade portions arranged along a circumferential direction of the rotor,
the first blade portion has a first inclined surface inclined with respect to a radial direction of the rotor such that a distance to the end surface of the rotor becomes shorter from an inner side in the radial direction toward an outer side in the radial direction of the rotor, and
the first inclined surface comes into contact with a refrigerant sprayed from the inner flow path through the communication hole by rotation of the shaft, and sprays the refrigerant toward a coil end of the coil.

2. The rotating electric machine according to claim 1, wherein the first inclined sprays an atomized refrigerant toward the coil end by rotation of the facing member.

3. The rotating electric machine according to claim 1, wherein the first blade portion is formed such that a refrigerant sprayed from the first inclined surface by rotation of the facing member comes into contact with a range from an inner peripheral side end portion to an outer peripheral side end portion of the coil end.

4. The rotating electric machine according to claim 1, wherein the first inclined surface has a shorter distance from the end surface of the rotor as it goes from one side toward another side in the circumferential direction.

5. The rotating electric machine according to claim 1, wherein
the facing member includes a disc portion having a disc shape and the first blade portion protruding from the disc portion toward the end surface of the rotor, and
the communication hole sprays a refrigerant to a space between the first blade portion and the shaft in the disc portion.

6. The rotating electric machine according to claim 5, wherein
the first blade portion includes
a first end point located further on an inner side in the radial direction than an outer peripheral surface of the disc portion,
a second end point located on an outer peripheral surface of the disc portion,
a third end point located on an outer peripheral surface of the disc portion,
a long side connecting the first end point and the second end point,
a short side connecting the first end point and the third end point,
a first side surface connecting the long side and the first inclined surface, and
a second side surface connecting the short side and the first inclined surface,
the long side is longer than the short side, and
a sum of lengths of the long sides of the plurality of first blade portions provided in the facing member is longer than a length of an outer periphery of the facing member.

7. The rotating electric machine according to claim 6, wherein a refrigerant flow path that tapers more as it goes from an inner side in the radial direction toward an outer side in the radial direction of the rotor is formed between the first blade portions adjacent in the circumferential direction.

8. The rotating electric machine according to claim 6, wherein
a plurality of the communication holes are formed along the circumferential direction of the shaft, and
the communication hole includes a refrigerant inlet formed on an inner peripheral surface of the shaft and a refrigerant outlet formed on an outer peripheral surface of the shaft, and is inclined with respect to the radial direction of the shaft such that the refrigerant outlet is arranged at a position closer to the disc portion of the facing member than the refrigerant inlet.

9. The rotating electric machine according to claim 1, wherein
the facing member includes a second blade portion protruding toward the end surface of the rotor further on an inner side in the radial direction of the rotor than the first blade portion,
the second blade portion is provided along the circumferential direction,
the second blade portion has a second inclined surface inclined with respect to the radial direction of the rotor such that a distance to the end surface of the rotor becomes shorter from an inner side in the radial direction toward an outer side in the radial direction of the rotor, and
a shortest distance in the axial direction from the second inclined surface to the end surface of the rotor is longer than a shortest distance in the axial direction from the first inclined surface to the end surface of the rotor.

10. The rotating electric machine according to claim 9, wherein
the facing member includes a disc portion having a disc shape, the first blade portion protruding from an end surface of the disc portion toward the end surface of the rotor, and the second blade portion protruding from the end surface of the disc portion toward the end surface of the rotor,
a plurality of the second blade portions are formed along the circumferential direction, and have an arc shape when viewed from the axial direction,
a groove portion recessed from the end surface of the disc portion is formed between the second blade portion and the shaft,
the communication hole sprays a refrigerant into the groove portion, and
a discharge flow path for discharging a refrigerant in the groove portion toward the first blade portion is formed between adjacent ones of the second blade portions.

* * * * *